United States Patent [19]

Zhao

[11] Patent Number: 5,670,982
[45] Date of Patent: Sep. 23, 1997

[54] SYSTEM FOR FAST 90-DEGREE ROTATION OF BI-LEVEL IMAGES

[75] Inventor: Albert Z. Zhao, Don Mills, Canada

[73] Assignee: International Business Machines Corporation, Armonk, N.Y.

[21] Appl. No.: 385,263

[22] Filed: Feb. 8, 1995

[51] Int. Cl.⁶ .................... G09G 5/34; G09G 1/06
[52] U.S. Cl. .................. 345/126; 382/296; 382/297
[58] Field of Search .................... 382/297, 296; 345/126

[56] References Cited

U.S. PATENT DOCUMENTS

| | | | |
|---|---|---|---|
| 4,593,407 | 6/1986 | Konishi et al. | 382/297 |
| 4,627,020 | 12/1986 | Anderson et al. | 345/126 |
| 4,703,515 | 10/1987 | Baroody, Jr. | 345/126 |
| 4,837,845 | 6/1989 | Pruett et al. | 345/126 |
| 4,947,344 | 8/1990 | Hayashi et al. | 345/126 |
| 4,985,849 | 1/1991 | Hideaki | 395/137 |
| 5,365,601 | 11/1994 | Kadakia et al. | 346/126 |
| 5,563,625 | 10/1996 | Scott | 345/126 |
| 5,598,181 | 1/1997 | Kermisch | 345/126 |

*Primary Examiner*—Richard Hjerpe
*Assistant Examiner*—Joseph J. Acosta
*Attorney, Agent, or Firm*—Ronald L. Drumheller

[57] ABSTRACT

A method for rotating bi-level image data plus or minus 90°. An 8×8 pixel block is selected for rotation from the image data and, using lookup tables, an intermediate matrix is generated dynamically and stored into two 32-bit registers in the processor. Generation of the intermediate matrix partially rotates and stores the odd-numbered rows from the block of data in the first 32-bit register and the even-numbered rows from the block in the second 32-bit register. The first and second registers are copied, respectively, into third and fourth 32-bit registers. The first and second registers are then shifted one bit in opposite directions. The first register is logical ORed with the fourth register, and the second register is logical ORed with the third register so that the even bits are replaced in one register and the odd bits in the other. These steps are repeated for all remaining blocks of image data.

13 Claims, 3 Drawing Sheets

SYSTEM FOR FAST 90-DEGREE ROTATION OF BI-LEVEL IMAGES

BACKGROUND OF THE INVENTION

1. Field of the Invention

The present invention relates to a digital image processing method and more particularly to a method for the fast rotation of bi-level images.

2. Description of the Prior Art

Bi-level images (also called monochrome images) are images having just two intensity levels (generally black and white or black and green) because their bi-level bitmaps contain a single bit per pixel. The entire bitmap for a screen for a resolution of 1,024×1,024 pixels is $2^{20}$ bits, or about 128,000 bytes.

Through the increasing proliferation in offices and home offices of low memory computers, such as workstations and personal computers, computer storage of office documentation, reports, forms, letters and even photographs, is becoming prevalent as a means for reducing physical storage requirements and improving accessability to common office files.

Documents are commonly received into computer systems by optical character reader (OCR) scan, facsimile or on-line data transmission. The challenge is to take the image of a document entered into a system, for example by OCR, and be able to manipulate it quickly and efficiently, so that it can be easily viewed by the end user.

Rotating a bi-level image of 90°, 180°, and 270° with respect to its orientation on input are among the most commonly used operations during document image processing. The traditional solution is to rotate the image one pixel at time, but this operation is very time consuming.

As a result, a number of methods have been proposed in the prior art for expediting image rotation, particularly plus or minus 90° rotations, since these are considerably more complex than 180° rotation due to the packed internal data representation of the image pixels, wherein each byte contains eight image pixels. The rotated image must occupy the storage that contained the original image before rotation. Thus, for this type of rotation, the number of rows must be a multiple of eight, since the bits in each vertical column are packed into bytes by the rotation and a row of the output image must not end with a fraction of a byte. Consequently, placeholding data values must be added to columns that are not multiples of eight.

U.S. Pat. No. 4,627,020 of IBM Corporation, sets forth a method for rotating an image by 90° that was considerably faster than the traditional method because it caused the rotation of up to 64 pixels (8 by 8 blocks) at a time, rather than just one pixel. A block of the image would be moved into temporary storage (called a look-up table) and divided into smaller groups of bytes of rotatable size. Each group that did not have the same value for all bits is then rotated. This method took advantage of the fact that large areas of most images are background colour (e.g. white), and that blocks or graphs of the image containing all one colour need not be rotated. This is an enhancement now commonly added to rotation methods. However, as will be seen, the method of the U.S. Pat. No. 4,627,020 is not as efficient as the method proposed in the present invention since it utilizes additional memory accesses and address manipulations for each byte rotated.

U.S. Pat. No. 4,658,430, also of IBM Corporation, is directed to a method for rotating encoded data images that have, for example, been transmitted over a telephone line, by a multiple of 90°. The orientation of encoded date presents different problems from the rotation of the type of data to which the present invention is addressed.

U.S. Pat. No. 4,837,845 of IBM Corporation is specifically directed to the problem of rotating binary image data plus or minus 90° from its original orientation. The image data is first stored in partially transposed form in a matrix contained in eight 32-bit registers. The matrix is separated into groups of bits of rotatable size (sub-matrices of equal size), and first preselected bit positions are transposed with second preselected bit positions in each group. Rows of bits in the groups are then exchanged with second rows of bits in the groups.

Each of these IBM patens discuss, as prior art, a number of much earlier publications and references directed to solving the problems associated with image rotation, and the contents of each of these IBM patents, particularly in their sections describing the prior art, are incorporated herein by reference.

In addition to the foregoing, U.S. Pat. No. 4,916,746 of International Computers Limited discloses rotating an image through 90 degrees, either clockwise or counterclockwise, using a hardware rotation circuit. The rotation circuit comprises a FIFO and shift register, where data is read out of the FIFO a word at a time and written back into the FIFO with a displacement of one bit, effecting a spiral data path. The shift register is then used to assemble the output rotated image data.

U.S. Pat. No. 4,985,849 of Canon K.K. discloses an image processing system for forming a slantwise mapped or rotated modified image of an original image. The relation between the address locations of the original points of data and the output points is calculated, and these calculated values are prestored in lookup tables. The image data from the original address locations is then transferred or copied using the output address information from the lookup tables.

U.S. Pat. No. 5,067,167 of Cornell Research Foundation Inc. discloses rotating a three-dimensional image by 90° by using a data processor to modify the original spacial coordinate values of the three-dimensional image.

U.S. Pat. No. 5,233,168 of Pitney Bowes Inc. discloses deskewing an image by scanning the image to capture a pixel by pixel mapped image, determining size and skew of the mapped image, performing a series of area-limited vertical pixel shifts, and performing a series of area-limited horizontal pixel shifts.

Other approaches to providing rapid image rotation have been hardware specific solutions, such as a special hardware device called a rotation buffer disclosed in U.S. Pat. No. 4,947,344 of IBM Corporation or special circuitry disclosed in U.S. Pat. No. 4, 992,960 of Yamaha Corporation. However, these types of hardware solutions require considerable costs associated with modified existing hardware, as opposed to a solution implemented in software for maximizing the existing hardware storage capabilities.

SUMMARY OF THE INVENTION

Like the methods disclosed in previous IBM patents ('020, '430, and '845), the present invention also works on 64 pixel blocks of image data at a time in expediting image rotation to orientation of 90° or 270° from its orientation on input. However, because the method of the present invention requires fewer memory accesses than the prior art methods, it has been found to be 15 to 30% faster in operation on Intel-based IBM® personal computers having 32-bit registers, which is the type of environment to which this invention is predominantly directed.

Accordingly, the invention provides, in a 32-bit operating system, a method of rotating by 90° a block of bi-level image data having 8 rows by 8 columns of pixel data bits. The method includes the computer-implemented steps of generating an intermediate matrix having 8 rows by 8 columns of pixel data bits, wherein each row from the block has been divided and translated into a paired nibble column, alternate rows from the block being arranged transversely and lower order rows from the block being arranged on top of adjacent higher order rows in the paired nibble columns of the intermediate matrix and saving the rows of the intermediate matrix sequentially into first and second 32-bit registers. The first 32-bit register is then copied into a third 32-bit register and the second 32-bit register into a fourth 32-bit register. Each of the first and second registers is shifted by one bit in opposite directions and alternate bits from the fourth register are dynamically overlaid onto the first register while alternate bits from the third register are dynamically overlaid onto the second register.

The present invention is also directed to a system provided with means for carrying out the computer implemented steps of the method.

BRIEF DESCRIPTION OF THE DRAWINGS

Embodiments of the invention will now be described in detail in association with the accompanying figures, in which.

DETAILED DESCRIPTION OF THE PREFERRED EMBODIMENTS

The present invention operates in a 32-bit programming operating system environment such as IBM's OS/2® system, Posix Unix systems or Microsoft's system NT.

Figure 1:
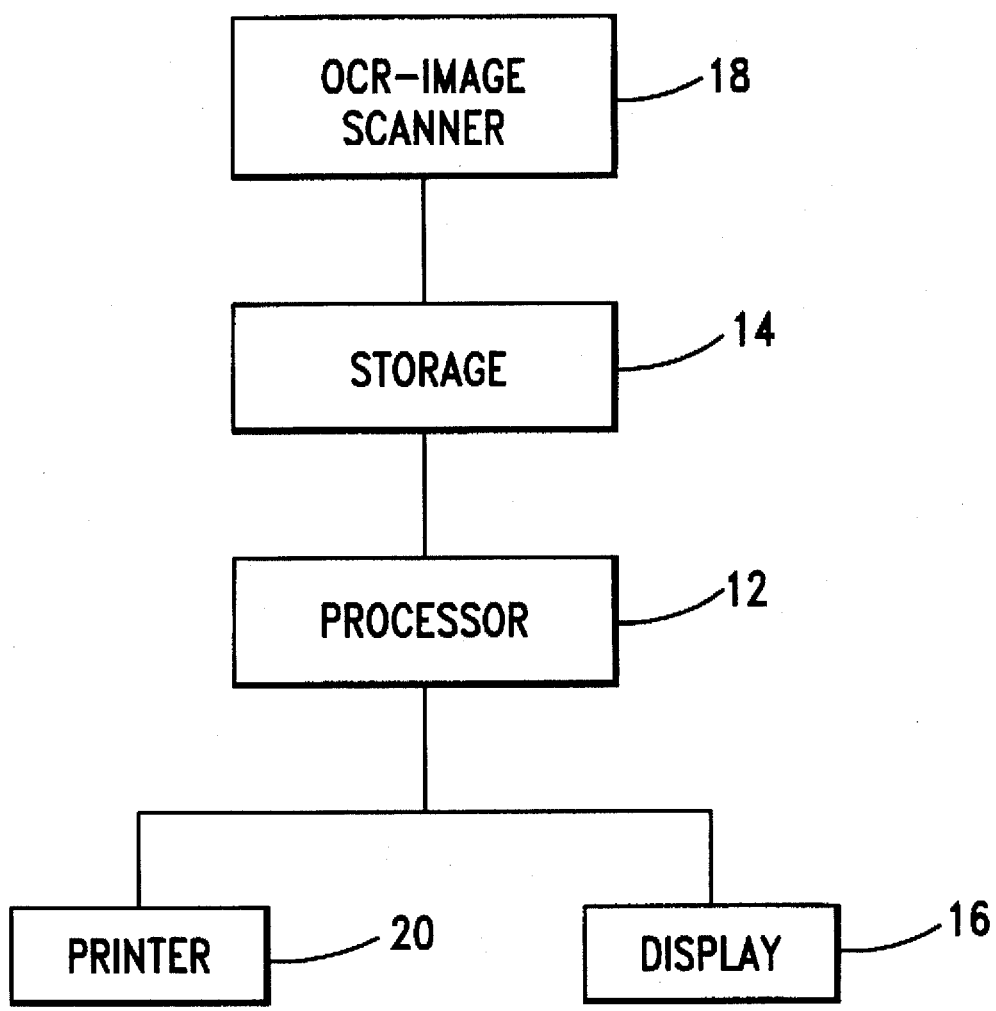
FIG. 1 is a schematic representation of a typical operating systems for practicing the present invention.

The elements of an operating system of this type are illustrated schematically in FIG. 1, and would typically include a host processor 12 having a 32-bit storage registers, an image storage 14, a display terminal 16, means for receiving image data, such as an OCR-image scanner 18, and a printer 20. Other means for receiving image data into the operating system would include data transmission and facsimile. The display terminal 16, the image scanner 18 and the printer 20 each may have different requirements for reading or presentation of a document or image. Accordingly, the processor 12 in conjunction with image storage 14 will be required to manipulate the image data to meet the presentation requirements of each of the peripheral devices 16, 18 and 20.

Figure 2:
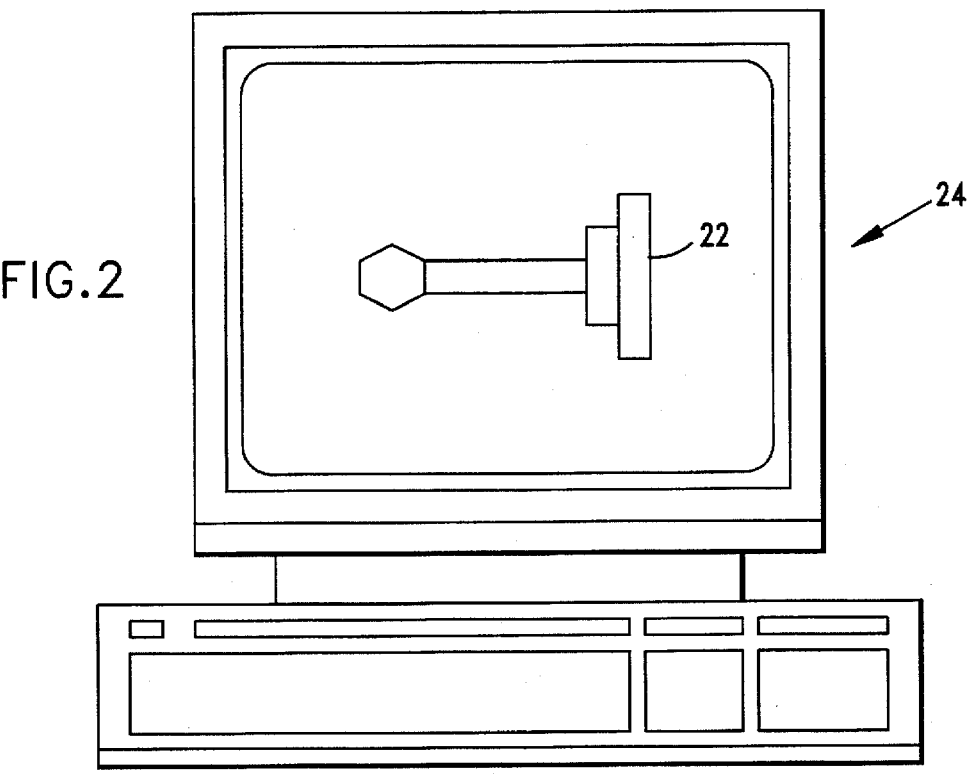
FIGS. 2 and 3 illustrate the display screen of a personal computer or work station showing a document oriented by a difference of 90°.
Figure 3:
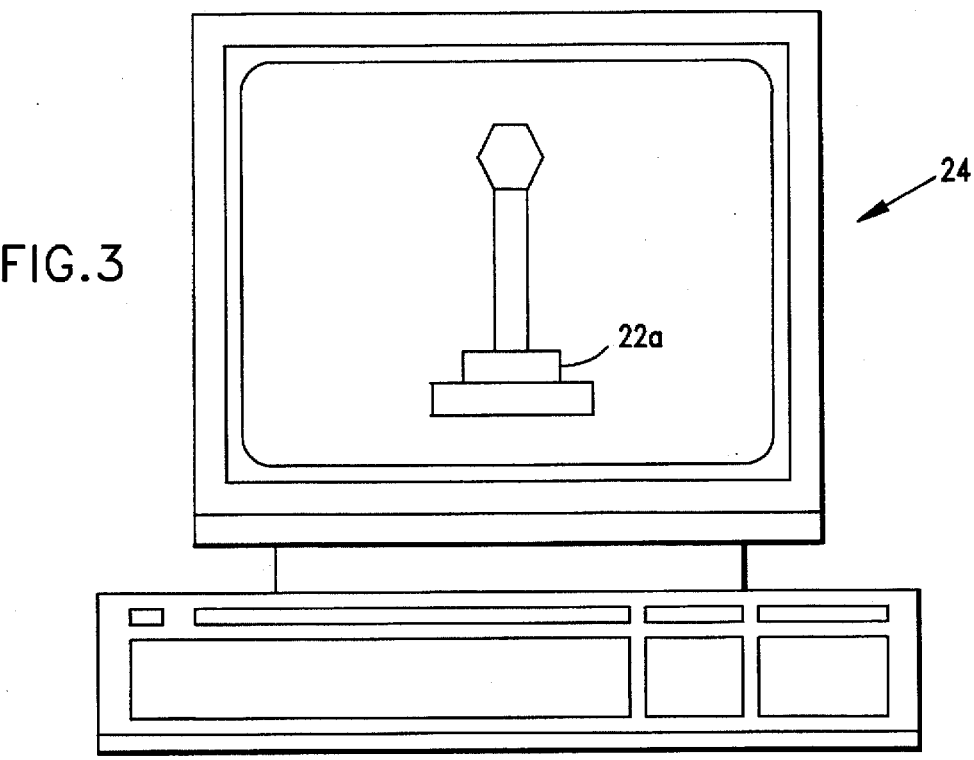

For example, a photographic image may be scanned into the system via scanner 18 and end up as a horizontally displayed image 22 on a computer display 24, such as illustrated in FIG. 2. In order for the end user to use the displayed image in any meaningful way, the orientation of the image must be rotated 90° clockwise to the position 22a shown on the computer display 24 in FIG. 3.

Figure 4:
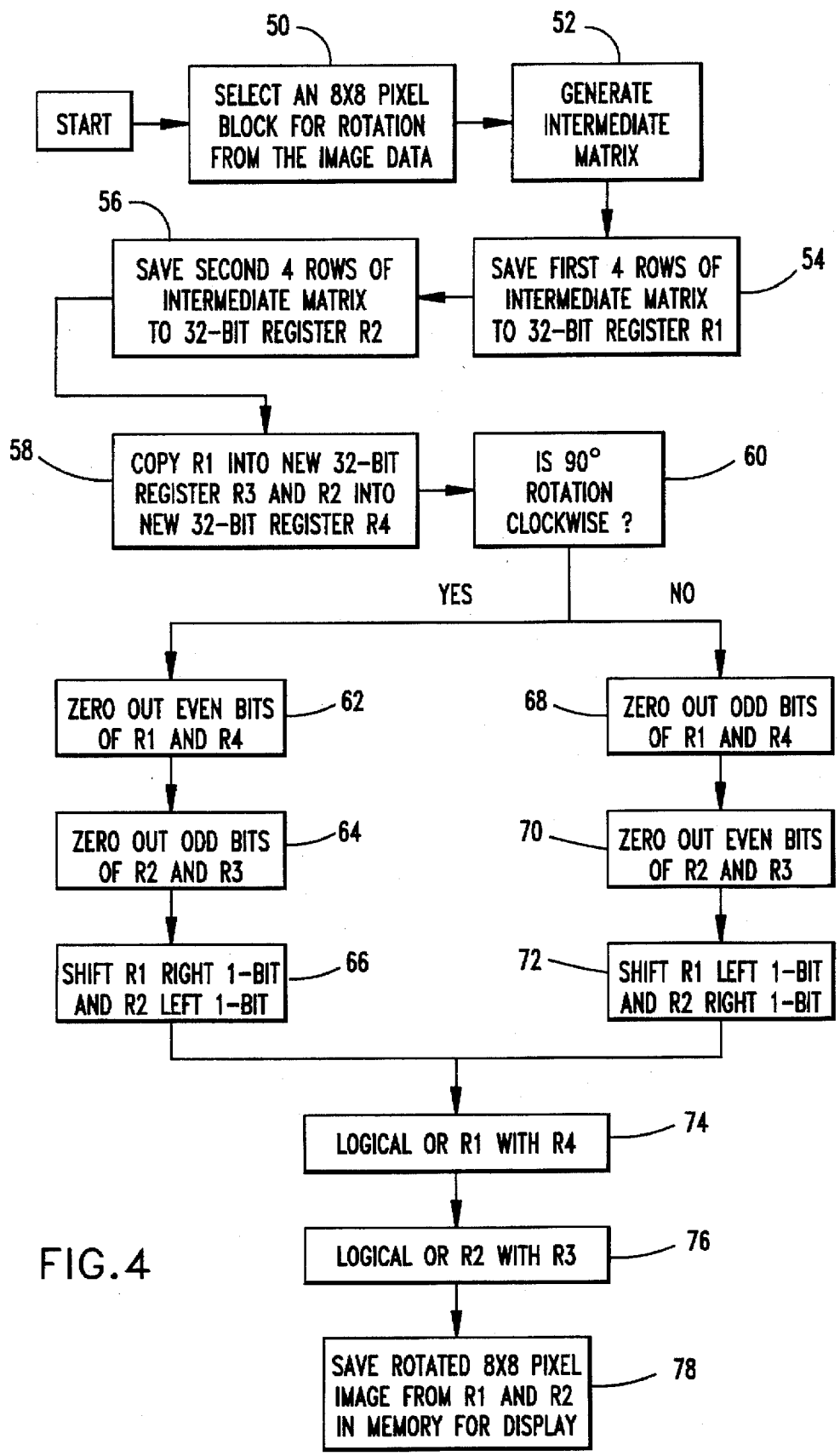
FIG. 4 is a flow diagram illustrating the computer implemented steps in rotating a image 90° clockwise or counter-clockwise.

The steps of the method of this invention are illustrated in the flow diagram of FIG. 4. As discussed earlier, the present invention rotates image data in 8 by 8 pixel block segments. Thus, an 8 by 8 pixel block segment selected from the stored data of the entire image (block 50 in FIG. 4) may be represented by the 64 bit matrix set forth below in Table A:

TABLE A

| Row 1 | A7 | A6 | A5 | A4 | A3 | A2 | A1 | A0 |
|---|---|---|---|---|---|---|---|---|
| Row 2 | B7 | B6 | B5 | B4 | B3 | B2 | B1 | B0 |
| Row 3 | C7 | C6 | C5 | C4 | C3 | C2 | C1 | C0 |
| Row 4 | D7 | D6 | D5 | D4 | D3 | D2 | D1 | D0 |
| Row 5 | E7 | E6 | E5 | E4 | E3 | E2 | E1 | E0 |
| Row 6 | F7 | F6 | F5 | F4 | F3 | F2 | F1 | F0 |
| Row 7 | G7 | G6 | G5 | G4 | G3 | G2 | G1 | G0 |
| Row 8 | H7 | H6 | H5 | H4 | H3 | H2 | H1 | H0 |

Where A0, A1, ..., H6, H7 each represent a bi-level pixel forming the matrix.

Clockwise 90° rotation of the matrix of Table A turns the matrix on its side so that Row 1 becomes the right-hand column of 8 bits, with the A0 pixel at the bottom. Counterclockwise 90° rotation turns the matrix so that Row 1 becomes the left-hand column of 8 bits, with the A0 pixel at the top. These two resulting data representations are illustrated in Tables D and F in this description.

The same general principles and functions are applied to achieve both clockwise and counterclockwise rotation according to the invention. However, as will be discussed in detail below, the functions are reversed, in many cases, to achieve counterclockwise, rather than clockwise, rotation.

The working area for transforming the image data is 32-bit registers in the processor, from which the transformed data is moved back to the memory (storage) ready for display or printing. A 64-bit matrix can be stored in two 32-bit registers.

The present invention is performed in four main steps. First, an intermediate matrix is generated that sets the foundation for dividing the matrix into two register-size rows of 4-bytes each. The intermediate matrix is stored in the two target 32-bit registers, and then copied into a further pair of 32-bit registers. The data in the four registers is then manipulated, and the four registers are finally collapsed back into the original two that now contain the rotated data image.

Throughout, only three memory accesses per byte (or 24 per block) are required, first when the byte is read in a processor register, next when the value is used to access a lookup table for generating the intermediate matrix and a final memory access to save the rotated data back in memory.

This represents a 25% reduction over the next fastest rotation method of the prior art (which requires four memory accesses per byte or 32 for a full block), and accounts for the improved speed of the present invention.

According to the preferred embodiment of the invention, the selected 8 by 8 pixel matrix or block of image data is transformed into a intermediate matrix (block 52), that is re-arranged in a manner that starts the process of re-aligning the pixels to a position more proximate to their position following complete rotation. In the case of an intended 90° clockwise rotation, the intermediate matrix is as set out in Table B:

TABLE B

| Row 1 | G7 | G3 | E7 | E3 | C7 | C3 | A7 | A3 |
|---|---|---|---|---|---|---|---|---|
| Row 2 | G6 | G2 | E6 | E2 | C6 | C2 | A6 | A2 |
| Row 3 | G5 | G1 | E5 | E1 | C5 | C1 | A5 | A1 |

TABLE B-continued

| Row 4 | G4 | G0 | E4 | E0 | C4 | C0 | A4 | A0 |
|---|---|---|---|---|---|---|---|---|
| Row 5 | H7 | H3 | F7 | F3 | D7 | D3 | B7 | B3 |
| Row 6 | H6 | H2 | F6 | F2 | D6 | D2 | B6 | B2 |
| Row 7 | H5 | H1 | F5 | F1 | D5 | D1 | B5 | B1 |
| Row 8 | H4 | H0 | F4 | F0 | D4 | D0 | B4 | B0 |

The partial rearrangement for rotation effectively divides and translates each row into a pair of nibble columns. The first four rows of the intermediate matrix contain the translated paired nibble columns of the odd-numbered rows from the original block of data (i.e., rows A, C, E and G) arranged transversely. In the case of a clockwise rotation, the transverse arrangement is from right to left, with the higher order bits from each half-row arranged on top of the lower order bits. For counterclockwise rotation, it will be seen from reviewing Table E that the transverse arrangement is from left to right, with the lower order bits arranged on top of the higher order bits from each half row. The bottom four rows of the intermediate matrix contain the even-numbered rows from the original block of data (i.e., rows B, D, F, and H) in the same arrangement as the upper four rows.

In the preferred embodiment of the invention, the intermediate matrix is generated using four lookup tables, which are set out in the section titled Appendix which forms part of the present disclosure.

Each of the four lookup tables is responsible for converting two rows in the 8 by 8 pixel matrix. For clockwise rotation, Table 1 from the Appendix is used for converting Rows 1 and 2, Table 2 for Rows 3 and 4, Table 3 for Rows 5 and 6, and Table 4 for Rows 7 and 8, and the rows are converted alternately (i.e. rows 1, 3, 5 and 7, followed by rows 2, 4, 6 and 8). For counterclockwise rotation, the lookup tables are used in the reverse order, that is, Table 1 is used for converting Rows 8 and 7, Table 2 for Rows 6 and 5, Table 3 for Rows 4 and 3, and Table 4 for Rows 2 and 1.

Generation of the intermediate matrix, in the preferred embodiment, is by dynamic overlay with the results being saved immediately to two 32-bit processor registers.

Use of the lookup tables for a 90° clockwise rotation can be illustrated by the following example, starting with the bi-level 8 by 8 pixel matrix in binary rotation set out in Table C.

TABLE C

| Row 1 | 0 | 0 | 0 | 0 | 1 | 1 | 1 | 1 |
|---|---|---|---|---|---|---|---|---|
| Row 2 | 0 | 0 | 0 | 0 | 0 | 0 | 1 | 1 |
| Row 3 | 0 | 0 | 0 | 1 | 0 | 1 | 0 | 0 |
| Row 4 | 0 | 0 | 0 | 1 | 0 | 1 | 0 | 1 |
| Row 5 | 0 | 0 | 1 | 1 | 0 | 0 | 0 | 0 |
| Row 6 | 0 | 1 | 0 | 1 | 1 | 1 | 0 | 0 |
| Row 7 | 0 | 0 | 1 | 0 | 1 | 1 | 1 | 0 |
| Row 8 | 0 | 0 | 1 | 0 | 0 | 0 | 1 | 0 |

First, for row 1, entry 15 of lookup table 1 is used:

**** Lookup Table 1:

| ROW | From BINARY REPRESEN- TATION | To BINARY REPRESENTATION | | | |
|---|---|---|---|---|---|
| 15 | 00001111 | 00000001 | 00000001 | 00000001 | 00000001 |

| R1 | BYTE 3 | BYTE 2 | BYTE 1 | BYTE 0 |
|---|---|---|---|---|
|  | 00000001 | 00000001 | 00000001 | 00000001 |

Next, for row 3, entry 20 of lookup table 2 is used:

**** LOOKUP TABLE 2:

| ROW | FROM BINARY REPRESEN- TATION | TO BINARY REPRESENTATION | | | |
|---|---|---|---|---|---|
| 20 | 00010100 | 00000000 | 00000100 | 00000000 | 00001000 |

This value is logical ORed, or dynamically overlaid with the 4-byte value for row 1, in which any "one" value from either 4-byte row replaces a "zero" value. The resulting revision of the first 32-bit register is:

| R1 | BYTE 3 | BYTE 2 | BYTE 1 | BYTE 0 |
|---|---|---|---|---|
|  | 00000001 | 00000101 | 00000001 | 00001001 |

Next, for row 5, entry 48 of lookup table 3 is used:

**** LOOKUP TABLE 3:

| ROW | FROM BINARY REPRESEN- TATION | TO BINARY REPRESENTATION | | | |
|---|---|---|---|---|---|
| 48 | 00110000 | 00000000 | 00000000 | 00100000 | 00100000 |

When this 4-byte value is logical ORed with the contents of R1 the following register value results:

| R1 | BYTE 3 | BYTE 2 | BYTE 1 | BYTE 0 |
|---|---|---|---|---|
|  | 00000001 | 00000101 | 00100001 | 00101001 |

Finally, for row 7, entry 46 of lookup table 4 is used:

****LOOKUP TABLE 4:

| ROW | FROM BINARY REPRESEN- TATION | TO BINARY REPRESENTATION | | | |
|---|---|---|---|---|---|
| 46 | 00101110 | 01000000 | 01000000 | 11000000 | 00000000 |

After logical ORing R1 with the value, register R1 contains:

| R1 | BYTE 3 | BYTE 2 | BYTE 1 | BYTE 0 |
|---|---|---|---|---|
|  | 01000001 | 01000101 | 11100001 | 00101001 |

Repeating the same procedures for row 2, 4, 6 and 8, using lookup table 1, 2, 3, and 4 respectively, the result is saved in R2 as:

| R2 | BYTE 3 | BYTE 2 | BYTE 1 | BYTE 0 |
|---|---|---|---|---|
|  | 00010000 | 00110100 | 11000001 | 00101101 |

This completes the process of the intermediate matrix generation. To clarify the results, the contents of R1 and R2 may be displayed in terms of bytes with higher-order bytes on top of lower order bytes in a matrix-like format as follows:

| | |
|---|---|
| R1 BYTE 3 | 0 1 0 0 0 0 0 1 |
| R1 BYTE 2 | 0 1 0 0 0 1 0 1 |
| R1 BYTE 1 | 1 1 1 0 0 0 0 1 |
| R1 BTYE 0 | 0 0 1 0 1 0 0 1 |
| R2 BTYE 3 | 0 0 0 1 0 0 0 0 |
| R2 BYTE 2 | 0 0 1 1 0 1 0 0 |
| R3 BYTE 1 | 1 1 0 0 0 0 0 1 |
| R3 BYTE 0 | 0 0 1 0 1 1 0 1 |

Therefore, returning to the original generic example, the first four rows (or first four-byte row) of the intermediate matrix are saved into the first 32-bit register R1 (block 54) of FIG. 4, and the remaining four rows (or second four-byte row) of the matrix are saved into a second 32-bit register R2 (block 56). Thus, in a 32-bit environment, the intermediate matrix is held in the two 32-bit registers in R1 and R2 in the following representation:

| | | | | |
|---|---|---|---|---|
| R1: | G7 G3 E7 E3 C7 C3 A7 A3 | G6 G2 E6 E2 C6 C2 A6 A2 | G5 G1 E5 E1 C5 C1 A5 A1 | G4 G0 E4 E0 C4 C0 A4 A0 |
| R2: | H7 H3 F7 F3 D7 D3 B7 B3 | H6 H2 F6 F2 D6 D2 B6 B2 | H5 H1 F5 F1 D5 D1 B5 B1 | H4 H0 F4 F0 D4 D0 B4 B0 |

The contents of registers R1 and R2 are then copied to two other 32-bit registers R3 and R4 respectively (block 58) to achieve the following representation.

| | | | | |
|---|---|---|---|---|
| R1: | G7 G3 E7 E3 C7 C3 A7 A3 | G6 G2 E6 E2 C6 C2 A6 A2 | G5 G1 E5 E1 C5 C1 A5 A1 | G4 G0 E4 E0 C4 C0 A4 A0 |
| R2: | H7 H3 F7 F3 D7 D3 B7 B3 | H6 H2 F6 F2 D6 D2 B6 B2 | H5 H1 F5 F1 D5 D1 B5 B1 | H4 H0 F4 F0 D4 D0 B4 B0 |
| R3: | G7 G3 E7 E3 C7 C3 A7 A3 | G6 G2 E6 E2 C6 C2 A6 A2 | G5 G1 E5 E1 C5 C1 A5 A1 | G4 G0 E4 E0 C4 C0 A4 A0 |
| R4: | H7 H3 F7 F3 D7 D3 B7 B3 | H6 H2 F6 F2 D6 D2 B6 B2 | H5 H1 F5 F1 D5 D1 B5 B1 | H4 H0 F4 F0 D4 D0 B4 B0 |

When the rotation is an 90° clockwise rotation (block 60), the even bits R1 and R4 are zeroed out (block 62) and the odd bits of R2 and R3 are zeroed out (block 64), to yield the following changes in the registers:

| | | | | |
|---|---|---|---|---|
| R1: | G7 00 E7 00 C7 00 A7 00 | G6 00 E6 00 C6 00 A6 00 | G5 00 E5 00 C5 00 A5 00 | G4 00 E4 00 C4 00 A4 00 |
| R2: | 00 H3 00 F3 00 D3 00 B3 | 00 H2 00 F2 00 D2 00 B2 | 00 H1 00 F1 00 D1 00 B1 | 00 H0 00 F0 00 D0 00 B0 |
| R3: | 00 G3 00 E3 00 C3 00 A3 | 00 G2 00 E2 00 C2 00 A2 | 00 G1 00 E1 00 C1 00 A1 | 00 G0 00 E0 00 C0 00 A0 |
| R4: | H7 00 F7 00 D7 00 B7 00 | H6 00 F6 00 D6 00 B6 00 | H5 00 F5 00 D5 00 B5 00 | H4 00 F4 00 D4 00 B4 00 |

The contents of R1 are then shifted right by one bit and the contents of R2 are shifted left by one bit (block 66), so that the contents of the four registers appears as follows:

| | | | | |
|---|---|---|---|---|
| R1: | 00 G7 00 E7 00 C7 00 A7 | 00 G6 00 E6 00 C6 00 A6 | 00 G5 00 E5 00 C5 00 A5 | 00 G4 00 E4 00 C4 00 A4 |
| R2: | H3 00 F3 00 D3 00 B3 00 | H2 00 F2 00 D2 00 B2 00 | H1 00 F1 00 D1 00 B1 00 | H0 00 F0 00 D0 00 B0 00 |
| R3: | 00 G3 00 E3 00 C3 00 A3 | 00 G2 00 E2 00 C2 00 A2 | 00 G1 00 E1 00 C1 00 A1 | 00 G0 00 E0 00 C0 00 A0 |
| R4: | H7 00 F7 00 D7 00 B7 00 | H6 00 F6 00 D6 00 B6 00 | H5 00 F5 00 D5 00 B5 00 | H4 00 F4 00 D4 00 B4 00 |

Next R1 is logical ORed with R4 (block 74) and R2 is logical ORed with R3 (block 76) to achieve the following content of registers R1 and R2:

| | | | | |
|---|---|---|---|---|
| R1: | H7 G7 F7 E7 D7 C7 B7 A7 | H6 G6 F6 E6 D6 C6 B6 A6 | H5 G5 F5 E5 D5 C5 B5 A5 | H4 G4 F4 E4 D4 C4 B4 A4 |
| R2: | H3 G3 F3 E3 D3 C3 B3 A3 | H2 G2 F2 E2 D3 C2 B2 A2 | H1 G1 F1 E1 D1 C1 B1 A1 | H0 G0 F0 E0 D0 C0 B0 A0 |

In matrix formation, R1 and R2 now contain the rotated 8 by 8 pixel matrix:

TABLE D

R1:

| H7 | G7 | F7 | E7 | D7 | C7 | B7 | A7 |
| H6 | G6 | F6 | E6 | D6 | C6 | B6 | A6 |
| H5 | G5 | F5 | E5 | D5 | C5 | B5 | A5 |
| H4 | G4 | F4 | E4 | D4 | C4 | B4 | A4 |

R2:

| H3 | G3 | F3 | E3 | D3 | C3 | B3 | A3 |
| H2 | G2 | F2 | E2 | D2 | C2 | B2 | A2 |
| H1 | G1 | F1 | E1 | D1 | C1 | B1 | A1 |
| H0 | G0 | F0 | E0 | D0 | C0 | B0 | A0 |

90° counterclockwise rotation is achieved following a similar method. Generation of the intermediate matrix, as mentioned above, is performed in the preferred embodiment using the lookup tables in reverse order, to generate an intermediate matrix from Table A, as follows:

TABLE E

| Row 1 | A4 | A0 | C4 | C0 | E4 | E0 | G4 | G0 |
| --- | --- | --- | --- | --- | --- | --- | --- | --- |
| Row 2 | A5 | A1 | C5 | C1 | E5 | E1 | G5 | G1 |
| Row 3 | A6 | A2 | C6 | C2 | E6 | E2 | G6 | G2 |
| Row 4 | A7 | A3 | C7 | C3 | E7 | E3 | G7 | G3 |
| Row 5 | B4 | B0 | D4 | D0 | F4 | F0 | H4 | H0 |
| Row 6 | B5 | B1 | D5 | D1 | F5 | F1 | H5 | H1 |
| Row 7 | B6 | B2 | D6 | D2 | F6 | F2 | H6 | H2 |
| Row 8 | B7 | B3 | D7 | D3 | F7 | F3 | H7 | H3 |

In a 32-bit environment, the above intermediate matrix can be held in the two 32-bit registers R1 and R2 (blocks 54 and 56) in the following representation:

| R1: | A7 A3 C7 C3 E7 E3 G7 G3 | A6 A2 C6 C2 E6 E2 G6 G2 | A5 A1 C5 C1 E5 E1 G5 G1 | A4 A0 C4 C0 E4 E0 G4 G0 |
| R2: | B7 B3 D7 D3 F7 F3 H7 H3 | B6 B2 D6 D2 F6 F2 H6 H2 | B5 B1 D5 D1 F5 F1 H5 H1 | B4 B0 D4 D0 F4 F0 H4 H0 |

The contents of R1 and R2 are then copied to the two other 32-bit registers R3 and R4, respectively (block 58):

| R1: | A7 A3 C7 C3 E7 E3 G7 G1 | A6 A2 C6 C2 E6 E2 G6 G2 | A5 A1 C5 C1 E5 E1 G5 G1 | A4 A0 C4 C0 E4 E0 G4 G0 |
| R2: | B7 B3 D7 D3 F7 F3 H7 H3 | B6 B2 D6 D2 F6 F2 H6 H2 | B5 B1 D5 D1 F5 F1 H5 H1 | B4 B0 D4 D0 F4 F0 H4 H0 |
| R3: | A7 A3 C7 C3 E7 E3 G7 G1 | B6 B2 D6 D2 F6 F2 H6 H2 | B5 B1 D5 D1 F5 F1 H5 H1 | B4 B0 D4 D0 F4 F0 H4 H0 |
| R4: | B7 B3 D7 D3 F7 F3 H7 H3 | B6 B2 D6 D2 F6 F2 H6 H2 | B5 B1 D5 D1 F5 F1 H5 H1 | B4 B0 D4 D0 F4 F0 H4 H0 |

For the counterclockwise rotation (block 60), the odd bits of R1 and R4 are zeroed out (block 68) and the even bits of R2 and R3 are zeroed out (block 70). This changes the contents of the four registers as follows:

| R1: | 00 A3 00 C3 00 E3 00 G3 | 00 A2 00 C2 00 E2 00 G2 | 00 A1 00 C1 00 E1 00 G1 | 00 A0 00 C0 00 E0 00 G0 |
| R2: | B7 00 D7 00 F7 00 H7 00 | B6 00 D6 00 F6 00 H6 00 | B5 00 D5 00 F5 00 H5 00 | B4 00 D4 00 F4 00 H4 00 |
| R3: | A7 00 C7 00 E7 00 G7 00 | A6 00 C6 00 E6 00 G6 00 | A5 00 C5 00 E5 00 G5 00 | A4 00 C4 00 E4 00 G4 00 |
| R4: | 00 B3 00 D3 00 F3 00 H3 | 00 B2 00 D2 00 F2 00 H2 | 00 B1 00 D1 00 F1 00 H1 | 00 B0 00 D0 00 F0 00 F0 |

The contents of R1 are shifted left by 1 bit and the contents of R2 (block 72) so that the 4 registers now appear as:

| R1: | A3 00 C3 00 E3 00 G3 00 | A2 00 C2 00 E2 00 G2 00 | A1 00 C1 00 E1 00 G1 00 | A0 00 C0 00 E0 00 G0 00 |
| R2: | 00 B7 00 D7 00 F7 00 H7 | 00 B6 00 D6 00 F6 00 H6 | 00 B5 00 D5 00 F5 00 H5 | 00 B4 00 D4 00 F4 00 H4 |
| R3: | 07 00 C7 00 E7 00 G7 00 | A6 00 C6 00 E6 00 G6 00 | A5 00 C5 00 E5 00 G5 00 | A4 00 C4 00 E4 00 G4 00 |
| R4: | 00 B3 00 D3 00 F3 00 H3 | 00 B2 00 D2 00 F2 00 H2 | 00 B1 00 D1 00 F1 00 H1 | 00 B0 00 D0 00 F0 00 H0 |

R1 is logical ORed with R4 (block 74), and R2 and R3 (block 76). The first two registers then have the following representation:

| R1: | A3 B3 C3 D3 E3 F3 G3 H3 | A2 B2 C2 D2 E2 F2 G2 H2 | A1 B1 C1 D1 E1 F1 G1 H1 | A0 B0 C0 D0 E0 F0 G0 H0 |
|---|---|---|---|---|
| R2: | A7 B7 C7 D7 E7 F7 G7 H7 | A6 B6 C6 D6 E6 F6 G6 H6 | A5 B5 C5 D5 E5 F5 G5 H5 | A4 B4 C4 D4 E4 F4 G4 H4 |

R1 and R2 now contain the 8 by 8 pixel matrix rotated 90° counterclockwise from the original orientation. Presented in matrix formation, the data appears as follows:

TABLE F

R1:

| A0 | B0 | C0 | D0 | E0 | F0 | G0 | H0 |
|---|---|---|---|---|---|---|---|
| A1 | B1 | C1 | D1 | E1 | F1 | G1 | H1 |
| A2 | B2 | C2 | D2 | E2 | F2 | G2 | H2 |
| A3 | B3 | C3 | D3 | E3 | F3 | G3 | H3 |

R2:

| A4 | B4 | C4 | D4 | E4 | F4 | G4 | H4 |
|---|---|---|---|---|---|---|---|
| A5 | B5 | C5 | D5 | E5 | F5 | G5 | H5 |

TABLE F-continued

| A6 | B6 | C6 | D6 | E6 | F6 | G6 | H6 |
|---|---|---|---|---|---|---|---|
| A7 | B7 | C7 | D7 | E7 | F7 | G7 | H7 |

In the preferred embodiment implemented on an IBM 32-bit machine, the method of the present invention runs consistently faster, and has less overhead when ported across 32-bit platforms, than previously known methods.

Test results have indicated that the present method is over 30% faster on Intel-based IBM PC computers, and the result would be even better if cache memories were used.

Modifications of the preferred embodiments described herein which would be obvious to one skilled in the art are intended to be covered by the appended claims.

APPENDIX

LOOKUP TABLE 1 :

| ENTRY | FROM<br>BINARY REPRESENTATION | TO<br>BINARY REPRESENTATION |
|---|---|---|
| 0 | 00000000 | 00000000 00000000 00000000 00000000 |
| 1 | 00000001 | 00000000 00000000 00000000 00000001 |
| 2 | 00000010 | 00000000 00000000 00000001 00000000 |
| 3 | 00000011 | 00000000 00000000 00000001 00000001 |
| 4 | 00000100 | 00000000 00000001 00000000 00000000 |
| 5 | 00000101 | 00000000 00000001 00000000 00000001 |
| 6 | 00000110 | 00000000 00000001 00000001 00000000 |
| 7 | 00000111 | 00000000 00000001 00000001 00000001 |
| 8 | 00001000 | 00000001 00000000 00000000 00000000 |
| 9 | 00001001 | 00000001 00000000 00000000 00000001 |
| 10 | 00001010 | 00000001 00000000 00000001 00000000 |
| 11 | 00001011 | 00000001 00000000 00000001 00000001 |
| 12 | 00001100 | 00000001 00000001 00000000 00000000 |
| 13 | 00001101 | 00000001 00000001 00000000 00000001 |
| 14 | 00001110 | 00000001 00000001 00000001 00000000 |
| 15 | 00001111 | 00000001 00000001 00000001 00000001 |
| 16 | 00010000 | 00000000 00000000 00000000 00000010 |
| 17 | 00010001 | 00000000 00000000 00000000 00000011 |
| 18 | 00010010 | 00000000 00000000 00000001 00000010 |
| 19 | 00010011 | 00000000 00000000 00000001 00000011 |
| 20 | 00010100 | 00000000 00000001 00000000 00000010 |
| 21 | 00010101 | 00000000 00000001 00000000 00000011 |
| 22 | 00010110 | 00000000 00000001 00000001 00000010 |
| 23 | 00010111 | 00000000 00000001 00000001 00000011 |
| 24 | 00011000 | 00000001 00000000 00000000 00000010 |
| 25 | 00011001 | 00000001 00000000 00000000 00000011 |
| 26 | 00011010 | 00000001 00000000 00000001 00000010 |
| 27 | 00011011 | 00000001 00000000 00000001 00000011 |
| 28 | 00011100 | 00000001 00000001 00000000 00000010 |
| 29 | 00011101 | 00000001 00000001 00000000 00000011 |
| 30 | 00011110 | 00000001 00000001 00000001 00000010 |
| 31 | 00011111 | 00000001 00000001 00000001 00000011 |
| 32 | 00100000 | 00000000 00000000 00000010 00000000 |
| 33 | 00100001 | 00000000 00000000 00000010 00000001 |
| 34 | 00100010 | 00000000 00000000 00000011 00000000 |
| 35 | 00100011 | 00000000 00000000 00000011 00000001 |
| 36 | 00100100 | 00000000 00000001 00000010 00000000 |
| 37 | 00100101 | 00000000 00000001 00000010 00000001 |
| 38 | 00100110 | 00000000 00000001 00000011 00000000 |
| 39 | 00100111 | 00000000 00000001 00000011 00000001 |

APPENDIX

| | | |
|---|---|---|
| 40 | 00101000 | 00000001 00000000 00000010 00000000 |
| 41 | 00101001 | 00000001 00000000 00000010 00000001 |
| 42 | 00101010 | 00000001 00000000 00000011 00000000 |
| 43 | 00101011 | 00000001 00000000 00000011 00000001 |
| 44 | 00101100 | 00000001 00000001 00000010 00000000 |
| 45 | 00101101 | 00000001 00000001 00000010 00000001 |
| 46 | 00101110 | 00000001 00000001 00000011 00000000 |
| 47 | 00101111 | 00000001 00000001 00000011 00000001 |
| | | |
| 48 | 00110000 | 00000000 00000000 00000010 00000010 |
| 49 | 00110001 | 00000000 00000000 00000010 00000011 |
| 50 | 00110010 | 00000000 00000000 00000011 00000010 |
| 51 | 00110011 | 00000000 00000000 00000011 00000011 |
| 52 | 00110100 | 00000000 00000001 00000010 00000010 |
| 53 | 00110101 | 00000000 00000001 00000010 00000011 |
| 54 | 00110110 | 00000000 00000001 00000011 00000010 |
| 55 | 00110111 | 00000000 00000001 00000011 00000011 |
| | | |
| 56 | 00111000 | 00000001 00000000 00000010 00000010 |
| 57 | 00111001 | 00000001 00000000 00000010 00000011 |
| 58 | 00111010 | 00000001 00000000 00000011 00000010 |
| 59 | 00111011 | 00000001 00000000 00000011 00000011 |
| 60 | 00111100 | 00000001 00000001 00000010 00000010 |
| 61 | 00111101 | 00000001 00000001 00000010 00000011 |
| 62 | 00111110 | 00000001 00000001 00000011 00000010 |
| 63 | 00111111 | 00000001 00000001 00000011 00000011 |
| | | |
| 64 | 01000000 | 00000000 00000010 00000000 00000000 |
| 65 | 01000001 | 00000000 00000010 00000000 00000001 |
| 66 | 01000010 | 00000000 00000010 00000001 00000000 |
| 67 | 01000011 | 00000000 00000010 00000001 00000001 |
| 68 | 01000100 | 00000000 00000011 00000000 00000000 |
| 69 | 01000101 | 00000000 00000011 00000000 00000001 |
| 70 | 01000110 | 00000000 00000011 00000001 00000000 |
| 71 | 01000111 | 00000000 00000011 00000001 00000001 |
| | | |
| 72 | 01001000 | 00000001 00000010 00000000 00000000 |
| 73 | 01001001 | 00000001 00000010 00000000 00000001 |
| 74 | 01001010 | 00000001 00000010 00000001 00000000 |
| 75 | 01001011 | 00000001 00000010 00000001 00000001 |
| 76 | 01001100 | 00000001 00000011 00000000 00000000 |
| 77 | 01001101 | 00000001 00000011 00000000 00000001 |
| 78 | 01001110 | 00000001 00000011 00000001 00000000 |
| 79 | 01001111 | 00000001 00000011 00000001 00000001 |
| | | |
| 80 | 01010000 | 00000000 00000010 00000000 00000010 |
| 81 | 01010001 | 00000000 00000010 00000000 00000011 |
| 82 | 01010010 | 00000000 00000010 00000001 00000010 |
| 83 | 01010011 | 00000000 00000010 00000001 00000011 |
| 84 | 01010100 | 00000000 00000011 00000000 00000010 |
| 85 | 01010101 | 00000000 00000011 00000000 00000011 |
| 86 | 01010110 | 00000000 00000011 00000001 00000010 |
| 87 | 01010111 | 00000000 00000011 00000001 00000011 |

APPENDIX

Page 3 of 24

| | | |
|---|---|---|
| 88 | 01011000 | 00000001 00000010 00000000 00000010 |
| 89 | 01011001 | 00000001 00000010 00000000 00000011 |
| 90 | 01011010 | 00000001 00000010 00000001 00000010 |
| 91 | 01011011 | 00000001 00000010 00000001 00000011 |
| 92 | 01011100 | 00000001 00000011 00000000 00000010 |
| 93 | 01011101 | 00000001 00000011 00000000 00000011 |
| 94 | 01011110 | 00000001 00000011 00000001 00000010 |
| 95 | 01011111 | 00000001 00000011 00000001 00000011 |
| 96 | 01100000 | 00000000 00000010 00000010 00000000 |
| 97 | 01100001 | 00000000 00000010 00000010 00000001 |
| 98 | 01100010 | 00000000 00000010 00000011 00000000 |
| 99 | 01100011 | 00000000 00000010 00000011 00000001 |
| 100 | 01100100 | 00000000 00000011 00000010 00000000 |
| 101 | 01100101 | 00000000 00000011 00000010 00000001 |
| 102 | 01100110 | 00000000 00000011 00000011 00000000 |
| 103 | 01100111 | 00000000 00000011 00000011 00000001 |
| 104 | 01101000 | 00000001 00000010 00000010 00000000 |
| 105 | 01101001 | 00000001 00000010 00000010 00000001 |
| 106 | 01101010 | 00000001 00000010 00000011 00000000 |
| 107 | 01101011 | 00000001 00000010 00000011 00000001 |
| 108 | 01101100 | 00000001 00000011 00000010 00000000 |
| 109 | 01101101 | 00000001 00000011 00000010 00000001 |
| 110 | 01101110 | 00000001 00000011 00000011 00000000 |
| 111 | 01101111 | 00000001 00000011 00000011 00000001 |
| 112 | 01110000 | 00000000 00000010 00000010 00000010 |
| 113 | 01110001 | 00000000 00000010 00000010 00000011 |
| 114 | 01110010 | 00000000 00000010 00000011 00000010 |
| 115 | 01110011 | 00000000 00000010 00000011 00000011 |
| 116 | 01110100 | 00000000 00000011 00000010 00000010 |
| 117 | 01110101 | 00000000 00000011 00000010 00000011 |
| 118 | 01110110 | 00000000 00000011 00000011 00000010 |
| 119 | 01110111 | 00000000 00000011 00000011 00000011 |
| 120 | 01111000 | 00000001 00000010 00000010 00000010 |
| 121 | 01111001 | 00000001 00000010 00000010 00000011 |
| 122 | 01111010 | 00000001 00000010 00000011 00000010 |
| 123 | 01111011 | 00000001 00000010 00000011 00000011 |
| 124 | 01111100 | 00000001 00000011 00000010 00000010 |
| 125 | 01111101 | 00000001 00000011 00000010 00000011 |
| 126 | 01111110 | 00000001 00000011 00000011 00000010 |
| 127 | 01111111 | 00000001 00000011 00000011 00000011 |
| 128 | 10000000 | 00000010 00000000 00000000 00000000 |
| 129 | 10000001 | 00000010 00000000 00000000 00000001 |
| 130 | 10000010 | 00000010 00000000 00000001 00000000 |
| 131 | 10000011 | 00000010 00000000 00000001 00000001 |
| 132 | 10000100 | 00000010 00000001 00000000 00000000 |
| 133 | 10000101 | 00000010 00000001 00000000 00000001 |
| 134 | 10000110 | 00000010 00000001 00000001 00000000 |
| 135 | 10000111 | 00000010 00000001 00000001 00000001 |

APPENDIX

| | | |
|---|---|---|
| 136 | 10001000 | 00000011 00000000 00000000 00000000 |
| 137 | 10001001 | 00000011 00000000 00000000 00000001 |
| 138 | 10001010 | 00000011 00000000 00000001 00000000 |
| 139 | 10001011 | 00000011 00000000 00000001 00000001 |
| 140 | 10001100 | 00000011 00000001 00000000 00000000 |
| 141 | 10001101 | 00000011 00000001 00000000 00000001 |
| 142 | 10001110 | 00000011 00000001 00000001 00000000 |
| 143 | 10001111 | 00000011 00000001 00000001 00000001 |
| 144 | 10010000 | 00000010 00000000 00000000 00000010 |
| 145 | 10010001 | 00000010 00000000 00000000 00000011 |
| 146 | 10010010 | 00000010 00000000 00000001 00000010 |
| 147 | 10010011 | 00000010 00000000 00000001 00000011 |
| 148 | 10010100 | 00000010 00000001 00000000 00000010 |
| 149 | 10010101 | 00000010 00000001 00000000 00000011 |
| 150 | 10010110 | 00000010 00000001 00000001 00000010 |
| 151 | 10010111 | 00000010 00000001 00000001 00000011 |
| 152 | 10011000 | 00000011 00000000 00000000 00000010 |
| 153 | 10011001 | 00000011 00000000 00000000 00000011 |
| 154 | 10011010 | 00000011 00000000 00000001 00000010 |
| 155 | 10011011 | 00000011 00000000 00000001 00000011 |
| 156 | 10011100 | 00000011 00000001 00000000 00000010 |
| 157 | 10011101 | 00000011 00000001 00000000 00000011 |
| 158 | 10011110 | 00000011 00000001 00000001 00000010 |
| 159 | 10011111 | 00000011 00000001 00000001 00000011 |
| 160 | 10100000 | 00000010 00000000 00000010 00000000 |
| 161 | 10100001 | 00000010 00000000 00000010 00000001 |
| 162 | 10100010 | 00000010 00000000 00000011 00000000 |
| 163 | 10100011 | 00000010 00000000 00000011 00000001 |
| 164 | 10100100 | 00000010 00000001 00000010 00000000 |
| 165 | 10100101 | 00000010 00000001 00000010 00000001 |
| 166 | 10100110 | 00000010 00000001 00000011 00000000 |
| 167 | 10100111 | 00000010 00000001 00000011 00000001 |
| 168 | 10101000 | 00000011 00000000 00000010 00000000 |
| 169 | 10101001 | 00000011 00000000 00000010 00000001 |
| 170 | 10101010 | 00000011 00000000 00000011 00000000 |
| 171 | 10101011 | 00000011 00000000 00000011 00000001 |
| 172 | 10101100 | 00000011 00000001 00000010 00000000 |
| 173 | 10101101 | 00000011 00000001 00000010 00000001 |
| 174 | 10101110 | 00000011 00000001 00000011 00000000 |
| 175 | 10101111 | 00000011 00000001 00000011 00000001 |
| 176 | 10110000 | 00000010 00000000 00000010 00000010 |
| 177 | 10110001 | 00000010 00000000 00000010 00000011 |
| 178 | 10110010 | 00000010 00000000 00000011 00000010 |
| 179 | 10110011 | 00000010 00000000 00000011 00000011 |
| 180 | 10110100 | 00000010 00000001 00000010 00000010 |
| 181 | 10110101 | 00000010 00000001 00000010 00000011 |
| 182 | 10110110 | 00000010 00000001 00000011 00000010 |
| 183 | 10110111 | 00000010 00000001 00000011 00000011 |

APPENDIX

| | | |
|---|---|---|
| 184 | 10111000 | 00000011 00000000 00000010 00000010 |
| 185 | 10111001 | 00000011 00000000 00000010 00000011 |
| 186 | 10111010 | 00000011 00000000 00000011 00000010 |
| 187 | 10111011 | 00000011 00000000 00000011 00000011 |
| 188 | 10111100 | 00000011 00000001 00000010 00000010 |
| 189 | 10111101 | 00000011 00000001 00000010 00000011 |
| 190 | 10111110 | 00000011 00000001 00000011 00000010 |
| 191 | 10111111 | 00000011 00000001 00000011 00000011 |
| | | |
| 192 | 11000000 | 00000010 00000010 00000000 00000000 |
| 193 | 11000001 | 00000010 00000010 00000000 00000001 |
| 194 | 11000010 | 00000010 00000010 00000001 00000000 |
| 195 | 11000011 | 00000010 00000010 00000001 00000001 |
| 196 | 11000100 | 00000010 00000011 00000000 00000000 |
| 197 | 11000101 | 00000010 00000011 00000000 00000001 |
| 198 | 11000110 | 00000010 00000011 00000001 00000000 |
| 199 | 11000111 | 00000010 00000011 00000001 00000001 |
| | | |
| 200 | 11001000 | 00000011 00000010 00000000 00000000 |
| 201 | 11001001 | 00000011 00000010 00000000 00000001 |
| 202 | 11001010 | 00000011 00000010 00000001 00000000 |
| 203 | 11001011 | 00000011 00000010 00000001 00000001 |
| 204 | 11001100 | 00000011 00000011 00000000 00000000 |
| 205 | 11001101 | 00000011 00000011 00000000 00000001 |
| 206 | 11001110 | 00000011 00000011 00000001 00000000 |
| 207 | 11001111 | 00000011 00000011 00000001 00000001 |
| | | |
| 208 | 11010000 | 00000010 00000010 00000000 00000010 |
| 209 | 11010001 | 00000010 00000010 00000000 00000011 |
| 210 | 11010010 | 00000010 00000010 00000001 00000010 |
| 211 | 11010011 | 00000010 00000010 00000001 00000011 |
| 212 | 11010100 | 00000010 00000011 00000000 00000010 |
| 213 | 11010101 | 00000010 00000011 00000000 00000011 |
| 214 | 11010110 | 00000010 00000011 00000001 00000010 |
| 215 | 11010111 | 00000010 00000011 00000001 00000011 |
| | | |
| 216 | 11011000 | 00000011 00000010 00000000 00000010 |
| 217 | 11011001 | 00000011 00000010 00000000 00000011 |
| 218 | 11011010 | 00000011 00000010 00000001 00000010 |
| 219 | 11011011 | 00000011 00000010 00000001 00000011 |
| 220 | 11011100 | 00000011 00000011 00000000 00000010 |
| 221 | 11011101 | 00000011 00000011 00000000 00000011 |
| 222 | 11011110 | 00000011 00000011 00000001 00000010 |
| 223 | 11011111 | 00000011 00000011 00000001 00000011 |
| | | |
| 224 | 11100000 | 00000010 00000010 00000010 00000000 |
| 225 | 11100001 | 00000010 00000010 00000010 00000001 |
| 226 | 11100010 | 00000010 00000010 00000011 00000000 |
| 227 | 11100011 | 00000010 00000010 00000011 00000001 |
| 228 | 11100100 | 00000010 00000011 00000010 00000000 |
| 229 | 11100101 | 00000010 00000011 00000010 00000001 |
| 230 | 11100110 | 00000010 00000011 00000011 00000000 |
| 231 | 11100111 | 00000010 00000011 00000011 00000001 |

APPENDIX

| | | |
|---|---|---|
| 232 | 11101000 | 00000011 00000010 00000010 00000000 |
| 233 | 11101001 | 00000011 00000010 00000010 00000001 |
| 234 | 11101010 | 00000011 00000010 00000011 00000000 |
| 235 | 11101011 | 00000011 00000010 00000011 00000001 |
| 236 | 11101100 | 00000011 00000011 00000010 00000000 |
| 237 | 11101101 | 00000011 00000011 00000010 00000001 |
| 238 | 11101110 | 00000011 00000011 00000011 00000000 |
| 239 | 11101111 | 00000011 00000011 00000011 00000001 |
| | | |
| 240 | 11110000 | 00000010 00000010 00000010 00000010 |
| 241 | 11110001 | 00000010 00000010 00000010 00000011 |
| 242 | 11110010 | 00000010 00000010 00000011 00000010 |
| 243 | 11110011 | 00000010 00000010 00000011 00000011 |
| 244 | 11110100 | 00000010 00000011 00000010 00000010 |
| 245 | 11110101 | 00000010 00000011 00000010 00000011 |
| 246 | 11110110 | 00000010 00000011 00000011 00000010 |
| 247 | 11110111 | 00000010 00000011 00000011 00000011 |
| | | |
| 248 | 11111000 | 00000011 00000010 00000010 00000010 |
| 249 | 11111001 | 00000011 00000010 00000010 00000011 |
| 250 | 11111010 | 00000011 00000010 00000011 00000010 |
| 251 | 11111011 | 00000011 00000010 00000011 00000011 |
| 252 | 11111100 | 00000011 00000011 00000010 00000010 |
| 253 | 11111101 | 00000011 00000011 00000010 00000011 |
| 254 | 11111110 | 00000011 00000011 00000011 00000010 |
| 255 | 11111111 | 00000011 00000011 00000011 00000011 |

APPENDIX

LOOKUP TABLE 2:

| ENTRY | FROM<br>BINARY REPRESENTATION | TO<br>BINARY REPRESENTATION |
|---|---|---|
| 0 | 00000000 | 00000000 00000000 00000000 00000000 |
| 1 | 00000001 | 00000000 00000000 00000000 00000100 |
| 2 | 00000010 | 00000000 00000000 00000100 00000000 |
| 3 | 00000011 | 00000000 00000000 00000100 00000100 |
| 4 | 00000100 | 00000000 00000100 00000000 00000000 |
| 5 | 00000101 | 00000000 00000100 00000000 00000100 |
| 6 | 00000110 | 00000000 00000100 00000100 00000000 |
| 7 | 00000111 | 00000000 00000100 00000100 00000100 |
| 8 | 00001000 | 00000100 00000000 00000000 00000000 |
| 9 | 00001001 | 00000100 00000000 00000000 00000100 |
| 10 | 00001010 | 00000100 00000000 00000100 00000000 |
| 11 | 00001011 | 00000100 00000000 00000100 00000100 |
| 12 | 00001100 | 00000100 00000100 00000000 00000000 |
| 13 | 00001101 | 00000100 00000100 00000000 00000100 |
| 14 | 00001110 | 00000100 00000100 00000100 00000000 |
| 15 | 00001111 | 00000100 00000100 00000100 00000100 |
| 16 | 00010000 | 00000000 00000000 00000000 00001000 |
| 17 | 00010001 | 00000000 00000000 00000000 00001100 |
| 18 | 00010010 | 00000000 00000000 00000100 00001000 |
| 19 | 00010011 | 00000000 00000000 00000100 00001100 |
| 20 | 00010100 | 00000000 00000100 00000000 00001000 |
| 21 | 00010101 | 00000000 00000100 00000000 00001100 |
| 22 | 00010110 | 00000000 00000100 00000100 00001000 |
| 23 | 00010111 | 00000000 00000100 00000100 00001100 |
| 24 | 00011000 | 00000100 00000000 00000000 00001000 |
| 25 | 00011001 | 00000100 00000000 00000000 00001100 |
| 26 | 00011010 | 00000100 00000000 00000100 00001000 |
| 27 | 00011011 | 00000100 00000000 00000100 00001100 |
| 28 | 00011100 | 00000100 00000100 00000000 00001000 |
| 29 | 00011101 | 00000100 00000100 00000000 00001100 |
| 30 | 00011110 | 00000100 00000100 00000100 00001000 |
| 31 | 00011111 | 00000100 00000100 00000100 00001100 |
| 32 | 00100000 | 00000000 00000000 00001000 00000000 |
| 33 | 00100001 | 00000000 00000000 00001000 00000100 |
| 34 | 00100010 | 00000000 00000000 00001100 00000000 |
| 35 | 00100011 | 00000000 00000000 00001100 00000100 |
| 36 | 00100100 | 00000000 00000100 00001000 00000000 |
| 37 | 00100101 | 00000000 00000100 00001000 00000100 |
| 38 | 00100110 | 00000000 00000100 00001100 00000000 |
| 39 | 00100111 | 00000000 00000100 00001100 00000100 |

APPENDIX

| | | |
|---|---|---|
| 40 | 00101000 | 00000100 00000000 00001000 00000000 |
| 41 | 00101001 | 00000100 00000000 00001000 00000100 |
| 42 | 00101010 | 00000100 00000000 00001100 00000000 |
| 43 | 00101011 | 00000100 00000000 00001100 00000100 |
| 44 | 00101100 | 00000100 00000100 00001000 00000000 |
| 45 | 00101101 | 00000100 00000100 00001000 00000100 |
| 46 | 00101110 | 00000100 00000100 00001100 00000000 |
| 47 | 00101111 | 00000100 00000100 00001100 00000100 |
| | | |
| 48 | 00110000 | 00000000 00000000 00001000 00001000 |
| 49 | 00110001 | 00000000 00000000 00001000 00001100 |
| 50 | 00110010 | 00000000 00000000 00001100 00001000 |
| 51 | 00110011 | 00000000 00000000 00001100 00001100 |
| 52 | 00110100 | 00000000 00000100 00001000 00001000 |
| 53 | 00110101 | 00000000 00000100 00001000 00001100 |
| 54 | 00110110 | 00000000 00000100 00001100 00001000 |
| 55 | 00110111 | 00000000 00000100 00001100 00001100 |
| | | |
| 56 | 00111000 | 00000100 00000000 00001000 00001000 |
| 57 | 00111001 | 00000100 00000000 00001000 00001100 |
| 58 | 00111010 | 00000100 00000000 00001100 00001000 |
| 59 | 00111011 | 00000100 00000000 00001100 00001100 |
| 60 | 00111100 | 00000100 00000100 00001000 00001000 |
| 61 | 00111101 | 00000100 00000100 00001000 00001100 |
| 62 | 00111110 | 00000100 00000100 00001100 00001000 |
| 63 | 00111111 | 00000100 00000100 00001100 00001100 |
| | | |
| 64 | 01000000 | 00000000 00001000 00000000 00000000 |
| 65 | 01000001 | 00000000 00001000 00000000 00000100 |
| 66 | 01000010 | 00000000 00001000 00000100 00000000 |
| 67 | 01000011 | 00000000 00001000 00000100 00000100 |
| 68 | 01000100 | 00000000 00001100 00000000 00000000 |
| 69 | 01000101 | 00000000 00001100 00000000 00000100 |
| 70 | 01000110 | 00000000 00001100 00000100 00000000 |
| 71 | 01000111 | 00000000 00001100 00000100 00000100 |
| | | |
| 72 | 01001000 | 00000100 00001000 00000000 00000000 |
| 73 | 01001001 | 00000100 00001000 00000000 00000100 |
| 74 | 01001010 | 00000100 00001000 00000100 00000000 |
| 75 | 01001011 | 00000100 00001000 00000100 00000100 |
| 76 | 01001100 | 00000100 00001100 00000000 00000000 |
| 77 | 01001101 | 00000100 00001100 00000000 00000100 |
| 78 | 01001110 | 00000100 00001100 00000100 00000000 |
| 79 | 01001111 | 00000100 00001100 00000100 00000100 |
| | | |
| 80 | 01010000 | 00000000 00001000 00000000 00001000 |
| 81 | 01010001 | 00000000 00001000 00000000 00001100 |
| 82 | 01010010 | 00000000 00001000 00000100 00001000 |
| 83 | 01010011 | 00000000 00001000 00000100 00001100 |
| 84 | 01010100 | 00000000 00001100 00000000 00001000 |
| 85 | 01010101 | 00000000 00001100 00000000 00001100 |
| 86 | 01010110 | 00000000 00001100 00000100 00001000 |
| 87 | 01010111 | 00000000 00001100 00000100 00001100 |

APPENDIX

| | | |
|---|---|---|
| 88 | 01011000 | 00000100 00001000 00000000 00001000 |
| 89 | 01011001 | 00000100 00001000 00000000 00001100 |
| 90 | 01011010 | 00000100 00001000 00000100 00001000 |
| 91 | 01011011 | 00000100 00001000 00000100 00001100 |
| 92 | 01011100 | 00000100 00001100 00000000 00001000 |
| 93 | 01011101 | 00000100 00001100 00000000 00001100 |
| 94 | 01011110 | 00000100 00001100 00000100 00001000 |
| 95 | 01011111 | 00000100 00001100 00000100 00001100 |
| 96 | 01100000 | 00000000 00001000 00001000 00000000 |
| 97 | 01100001 | 00000000 00001000 00001000 00000100 |
| 98 | 01100010 | 00000000 00001000 00001100 00000000 |
| 99 | 01100011 | 00000000 00001000 00001100 00000100 |
| 100 | 01100100 | 00000000 00001100 00001000 00000000 |
| 101 | 01100101 | 00000000 00001100 00001000 00000100 |
| 102 | 01100110 | 00000000 00001100 00001100 00000000 |
| 103 | 01100111 | 00000000 00001100 00001100 00000100 |
| 104 | 01101000 | 00000100 00001000 00001000 00000000 |
| 105 | 01101001 | 00000100 00001000 00001000 00000100 |
| 106 | 01101010 | 00000100 00001000 00001100 00000000 |
| 107 | 01101011 | 00000100 00001000 00001100 00000100 |
| 108 | 01101100 | 00000100 00001100 00001000 00000000 |
| 109 | 01101101 | 00000100 00001100 00001000 00000100 |
| 110 | 01101110 | 00000100 00001100 00001100 00000000 |
| 111 | 01101111 | 00000100 00001100 00001100 00000100 |
| 112 | 01110000 | 00000000 00001000 00001000 00001000 |
| 113 | 01110001 | 00000000 00001000 00001000 00001100 |
| 114 | 01110010 | 00000000 00001000 00001100 00001000 |
| 115 | 01110011 | 00000000 00001000 00001100 00001100 |
| 116 | 01110100 | 00000000 00001100 00001000 00001000 |
| 117 | 01110101 | 00000000 00001100 00001000 00001100 |
| 118 | 01110110 | 00000000 00001100 00001100 00001000 |
| 119 | 01110111 | 00000000 00001100 00001100 00001100 |
| 120 | 01111000 | 00000100 00001000 00001000 00001000 |
| 121 | 01111001 | 00000100 00001000 00001000 00001100 |
| 122 | 01111010 | 00000100 00001000 00001100 00001000 |
| 123 | 01111011 | 00000100 00001000 00001100 00001100 |
| 124 | 01111100 | 00000100 00001100 00001000 00001000 |
| 125 | 01111101 | 00000100 00001100 00001000 00001100 |
| 126 | 01111110 | 00000100 00001100 00001100 00001000 |
| 127 | 01111111 | 00000100 00001100 00001100 00001100 |
| 128 | 10000000 | 00001000 00000000 00000000 00000000 |
| 129 | 10000001 | 00001000 00000000 00000000 00000100 |
| 130 | 10000010 | 00001000 00000000 00000100 00000000 |
| 131 | 10000011 | 00001000 00000000 00000100 00000100 |
| 132 | 10000100 | 00001000 00000100 00000000 00000000 |
| 133 | 10000101 | 00001000 00000100 00000000 00000100 |
| 134 | 10000110 | 00001000 00000100 00000100 00000000 |
| 135 | 10000111 | 00001000 00000100 00000100 00000100 |

APPENDIX

| | | |
|---|---|---|
| 136 | 10001000 | 00001100 00000000 00000000 00000000 |
| 137 | 10001001 | 00001100 00000000 00000000 00000100 |
| 138 | 10001010 | 00001100 00000000 00000100 00000000 |
| 139 | 10001011 | 00001100 00000000 00000100 00000100 |
| 140 | 10001100 | 00001100 00000100 00000000 00000000 |
| 141 | 10001101 | 00001100 00000100 00000000 00000100 |
| 142 | 10001110 | 00001100 00000100 00000100 00000000 |
| 143 | 10001111 | 00001100 00000100 00000100 00000100 |
| 144 | 10010000 | 00001000 00000000 00000000 00001000 |
| 145 | 10010001 | 00001000 00000000 00000000 00001100 |
| 146 | 10010010 | 00001000 00000000 00000100 00001000 |
| 147 | 10010011 | 00001000 00000000 00000100 00001100 |
| 148 | 10010100 | 00001000 00000100 00000000 00001000 |
| 149 | 10010101 | 00001000 00000100 00000000 00001100 |
| 150 | 10010110 | 00001000 00000100 00000100 00001000 |
| 151 | 10010111 | 00001000 00000100 00000100 00001100 |
| 152 | 10011000 | 00001100 00000000 00000000 00001000 |
| 153 | 10011001 | 00001100 00000000 00000000 00001100 |
| 154 | 10011010 | 00001100 00000000 00000100 00001000 |
| 155 | 10011011 | 00001100 00000000 00000100 00001100 |
| 156 | 10011100 | 00001100 00000100 00000000 00001000 |
| 157 | 10011101 | 00001100 00000100 00000000 00001100 |
| 158 | 10011110 | 00001100 00000100 00000100 00001000 |
| 159 | 10011111 | 00001100 00000100 00000100 00001100 |
| 160 | 10100000 | 00001000 00000000 00001000 00000000 |
| 161 | 10100001 | 00001000 00000000 00001000 00000100 |
| 162 | 10100010 | 00001000 00000000 00001100 00000000 |
| 163 | 10100011 | 00001000 00000000 00001100 00000100 |
| 164 | 10100100 | 00001000 00000100 00001000 00000000 |
| 165 | 10100101 | 00001000 00000100 00001000 00000100 |
| 166 | 10100110 | 00001000 00000100 00001100 00000000 |
| 167 | 10100111 | 00001000 00000100 00001100 00000100 |
| 168 | 10101000 | 00001100 00000000 00001000 00000000 |
| 169 | 10101001 | 00001100 00000000 00001000 00000100 |
| 170 | 10101010 | 00001100 00000000 00001100 00000000 |
| 171 | 10101011 | 00001100 00000000 00001100 00000100 |
| 172 | 10101100 | 00001100 00000100 00001000 00000000 |
| 173 | 10101101 | 00001100 00000100 00001000 00000100 |
| 174 | 10101110 | 00001100 00000100 00001100 00000000 |
| 175 | 10101111 | 00001100 00000100 00001100 00000100 |
| 176 | 10110000 | 00001000 00000000 00001000 00001000 |
| 177 | 10110001 | 00001000 00000000 00001000 00001100 |
| 178 | 10110010 | 00001000 00000000 00001100 00001000 |
| 179 | 10110011 | 00001000 00000000 00001100 00001100 |
| 180 | 10110100 | 00001000 00000100 00001000 00001000 |
| 181 | 10110101 | 00001000 00000100 00001000 00001100 |
| 182 | 10110110 | 00001000 00000100 00001100 00001000 |
| 183 | 10110111 | 00001000 00000100 00001100 00001100 |

APPENDIX

| | | |
|---|---|---|
| 184 | 10111000 | 00001100 00000000 00001000 00001000 |
| 185 | 10111001 | 00001100 00000000 00001000 00001100 |
| 186 | 10111010 | 00001100 00000000 00001100 00001000 |
| 187 | 10111011 | 00001100 00000000 00001100 00001100 |
| 188 | 10111100 | 00001100 00000100 00001000 00001000 |
| 189 | 10111101 | 00001100 00000100 00001000 00001100 |
| 190 | 10111110 | 00001100 00000100 00001100 00001000 |
| 191 | 10111111 | 00001100 00000100 00001100 00001100 |
| | | |
| 192 | 11000000 | 00001000 00001000 00000000 00000000 |
| 193 | 11000001 | 00001000 00001000 00000000 00000100 |
| 194 | 11000010 | 00001000 00001000 00000100 00000000 |
| 195 | 11000011 | 00001000 00001000 00000100 00000100 |
| 196 | 11000100 | 00001000 00001100 00000000 00000000 |
| 197 | 11000101 | 00001000 00001100 00000000 00000100 |
| 198 | 11000110 | 00001000 00001100 00000100 00000000 |
| 199 | 11000111 | 00001000 00001100 00000100 00000100 |
| | | |
| 200 | 11001000 | 00001100 00001000 00000000 00000000 |
| 201 | 11001001 | 00001100 00001000 00000000 00000100 |
| 202 | 11001010 | 00001100 00001000 00000100 00000000 |
| 203 | 11001011 | 00001100 00001000 00000100 00000100 |
| 204 | 11001100 | 00001100 00001100 00000000 00000000 |
| 205 | 11001101 | 00001100 00001100 00000000 00000100 |
| 206 | 11001110 | 00001100 00001100 00000100 00000000 |
| 207 | 11001111 | 00001100 00001100 00000100 00000100 |
| | | |
| 208 | 11010000 | 00001000 00001000 00000000 00001000 |
| 209 | 11010001 | 00001000 00001000 00000000 00001100 |
| 210 | 11010010 | 00001000 00001000 00000100 00001000 |
| 211 | 11010011 | 00001000 00001000 00000100 00001100 |
| 212 | 11010100 | 00001000 00001100 00000000 00001000 |
| 213 | 11010101 | 00001000 00001100 00000000 00001100 |
| 214 | 11010110 | 00001000 00001100 00000100 00001000 |
| 215 | 11010111 | 00001000 00001100 00000100 00001100 |
| | | |
| 216 | 11011000 | 00001100 00001000 00000000 00001000 |
| 217 | 11011001 | 00001100 00001000 00000000 00001100 |
| 218 | 11011010 | 00001100 00001000 00000100 00001000 |
| 219 | 11011011 | 00001100 00001000 00000100 00001100 |
| 220 | 11011100 | 00001100 00001100 00000000 00001000 |
| 221 | 11011101 | 00001100 00001100 00000000 00001100 |
| 222 | 11011110 | 00001100 00001100 00000100 00001000 |
| 223 | 11011111 | 00001100 00001100 00000100 00001100 |
| | | |
| 224 | 11100000 | 00001000 00001000 00001000 00000000 |
| 225 | 11100001 | 00001000 00001000 00001000 00000100 |
| 226 | 11100010 | 00001000 00001000 00001100 00000000 |
| 227 | 11100011 | 00001000 00001000 00001100 00000100 |
| 228 | 11100100 | 00001000 00001100 00001000 00000000 |
| 229 | 11100101 | 00001000 00001100 00001000 00000100 |
| 230 | 11100110 | 00001000 00001100 00001100 00000000 |
| 231 | 11100111 | 00001000 00001100 00001100 00000100 |

APPENDIX

| | | |
|---|---|---|
| 232 | 11101000 | 00001100 00001000 00001000 00000000 |
| 233 | 11101001 | 00001100 00001000 00001000 00000100 |
| 234 | 11101010 | 00001100 00001000 00001100 00000000 |
| 235 | 11101011 | 00001100 00001000 00001100 00000100 |
| 236 | 11101100 | 00001100 00001100 00001000 00000000 |
| 237 | 11101101 | 00001100 00001100 00001000 00000100 |
| 238 | 11101110 | 00001100 00001100 00001100 00000000 |
| 239 | 11101111 | 00001100 00001100 00001100 00000100 |
| 240 | 11110000 | 00001000 00001000 00001000 00001000 |
| 241 | 11110001 | 00001000 00001000 00001000 00001100 |
| 242 | 11110010 | 00001000 00001000 00001100 00001000 |
| 243 | 11110011 | 00001000 00001000 00001100 00001100 |
| 244 | 11110100 | 00001000 00001100 00001000 00001000 |
| 245 | 11110101 | 00001000 00001100 00001000 00001100 |
| 246 | 11110110 | 00001000 00001100 00001100 00001000 |
| 247 | 11110111 | 00001000 00001100 00001100 00001100 |
| 248 | 11111000 | 00001100 00001000 00001000 00001000 |
| 249 | 11111001 | 00001100 00001000 00001000 00001100 |
| 250 | 11111010 | 00001100 00001000 00001100 00001000 |
| 251 | 11111011 | 00001100 00001000 00001100 00001100 |
| 252 | 11111100 | 00001100 00001100 00001000 00001000 |
| 253 | 11111101 | 00001100 00001100 00001000 00001100 |
| 254 | 11111110 | 00001100 00001100 00001100 00001000 |
| 255 | 11111111 | 00001100 00001100 00001100 00001100 |

APPENDIX

LOOKUP TABLE 3:

| ENTRY | FROM BINARY REPRESENTATION | TO BINARY REPRESENTATION |
|---|---|---|
| 0 | 00000000 | 00000000 00000000 00000000 00000000 |
| 1 | 00000001 | 00000000 00000000 00000000 00010000 |
| 2 | 00000010 | 00000000 00000000 00010000 00000000 |
| 3 | 00000011 | 00000000 00000000 00010000 00010000 |
| 4 | 00000100 | 00000000 00010000 00000000 00000000 |
| 5 | 00000101 | 00000000 00010000 00000000 00010000 |
| 6 | 00000110 | 00000000 00010000 00010000 00000000 |
| 7 | 00000111 | 00000000 00010000 00010000 00010000 |
| 8 | 00001000 | 00010000 00000000 00000000 00000000 |
| 9 | 00001001 | 00010000 00000000 00000000 00010000 |
| 10 | 00001010 | 00010000 00000000 00010000 00000000 |
| 11 | 00001011 | 00010000 00000000 00010000 00010000 |
| 12 | 00001100 | 00010000 00010000 00000000 00000000 |
| 13 | 00001101 | 00010000 00010000 00000000 00010000 |
| 14 | 00001110 | 00010000 00010000 00010000 00000000 |
| 15 | 00001111 | 00010000 00010000 00010000 00010000 |
| 16 | 00010000 | 00000000 00000000 00000000 00100000 |
| 17 | 00010001 | 00000000 00000000 00000000 00110000 |
| 18 | 00010010 | 00000000 00000000 00010000 00100000 |
| 19 | 00010011 | 00000000 00000000 00010000 00110000 |
| 20 | 00010100 | 00000000 00010000 00000000 00100000 |
| 21 | 00010101 | 00000000 00010000 00000000 00110000 |
| 22 | 00010110 | 00000000 00010000 00010000 00100000 |
| 23 | 00010111 | 00000000 00010000 00010000 00110000 |
| 24 | 00011000 | 00010000 00000000 00000000 00100000 |
| 25 | 00011001 | 00010000 00000000 00000000 00110000 |
| 26 | 00011010 | 00010000 00000000 00010000 00100000 |
| 27 | 00011011 | 00010000 00000000 00010000 00110000 |
| 28 | 00011100 | 00010000 00010000 00000000 00100000 |
| 29 | 00011101 | 00010000 00010000 00000000 00110000 |
| 30 | 00011110 | 00010000 00010000 00010000 00100000 |
| 31 | 00011111 | 00010000 00010000 00010000 00110000 |
| 32 | 00100000 | 00000000 00000000 00100000 00000000 |
| 33 | 00100001 | 00000000 00000000 00100000 00010000 |
| 34 | 00100010 | 00000000 00000000 00110000 00000000 |
| 35 | 00100011 | 00000000 00000000 00110000 00010000 |
| 36 | 00100100 | 00000000 00010000 00100000 00000000 |
| 37 | 00100101 | 00000000 00010000 00100000 00010000 |
| 38 | 00100110 | 00000000 00010000 00110000 00000000 |
| 39 | 00100111 | 00000000 00010000 00110000 00010000 |

APPENDIX

| | | |
|---|---|---|
| 40 | 00101000 | 00010000 00000000 00100000 00000000 |
| 41 | 00101001 | 00010000 00000000 00100000 00010000 |
| 42 | 00101010 | 00010000 00000000 00110000 00000000 |
| 43 | 00101011 | 00010000 00000000 00110000 00010000 |
| 44 | 00101100 | 00010000 00010000 00100000 00000000 |
| 45 | 00101101 | 00010000 00010000 00100000 00010000 |
| 46 | 00101110 | 00010000 00010000 00110000 00000000 |
| 47 | 00101111 | 00010000 00010000 00110000 00010000 |
| 48 | 00110000 | 00000000 00000000 00100000 00100000 |
| 49 | 00110001 | 00000000 00000000 00100000 00110000 |
| 50 | 00110010 | 00000000 00000000 00110000 00100000 |
| 51 | 00110011 | 00000000 00000000 00110000 00110000 |
| 52 | 00110100 | 00000000 00010000 00100000 00100000 |
| 53 | 00110101 | 00000000 00010000 00100000 00110000 |
| 54 | 00110110 | 00000000 00010000 00110000 00100000 |
| 55 | 00110111 | 00000000 00010000 00110000 00110000 |
| 56 | 00111000 | 00010000 00000000 00100000 00100000 |
| 57 | 00111001 | 00010000 00000000 00100000 00110000 |
| 58 | 00111010 | 00010000 00000000 00110000 00100000 |
| 59 | 00111011 | 00010000 00000000 00110000 00110000 |
| 60 | 00111100 | 00010000 00010000 00100000 00100000 |
| 61 | 00111101 | 00010000 00010000 00100000 00110000 |
| 62 | 00111110 | 00010000 00010000 00110000 00100000 |
| 63 | 00111111 | 00010000 00010000 00110000 00110000 |
| 64 | 01000000 | 00000000 00100000 00000000 00000000 |
| 65 | 01000001 | 00000000 00100000 00000000 00010000 |
| 66 | 01000010 | 00000000 00100000 00010000 00000000 |
| 67 | 01000011 | 00000000 00100000 00010000 00010000 |
| 68 | 01000100 | 00000000 00110000 00000000 00000000 |
| 69 | 01000101 | 00000000 00110000 00000000 00010000 |
| 70 | 01000110 | 00000000 00110000 00010000 00000000 |
| 71 | 01000111 | 00000000 00110000 00010000 00010000 |
| 72 | 01001000 | 00010000 00100000 00000000 00000000 |
| 73 | 01001001 | 00010000 00100000 00000000 00010000 |
| 74 | 01001010 | 00010000 00100000 00010000 00000000 |
| 75 | 01001011 | 00010000 00100000 00010000 00010000 |
| 76 | 01001100 | 00010000 00110000 00000000 00000000 |
| 77 | 01001101 | 00010000 00110000 00000000 00010000 |
| 78 | 01001110 | 00010000 00110000 00010000 00000000 |
| 79 | 01001111 | 00010000 00110000 00010000 00010000 |
| 80 | 01010000 | 00000000 00100000 00000000 00100000 |
| 81 | 01010001 | 00000000 00100000 00000000 00110000 |
| 82 | 01010010 | 00000000 00100000 00010000 00100000 |
| 83 | 01010011 | 00000000 00100000 00010000 00110000 |
| 84 | 01010100 | 00000000 00110000 00000000 00100000 |
| 85 | 01010101 | 00000000 00110000 00000000 00110000 |
| 86 | 01010110 | 00000000 00110000 00010000 00100000 |
| 87 | 01010111 | 00000000 00110000 00010000 00110000 |

APPENDIX

Page 15 of 24

| | | |
|---|---|---|
| 88 | 01011000 | 00010000 00100000 00000000 00100000 |
| 89 | 01011001 | 00010000 00100000 00000000 00110000 |
| 90 | 01011010 | 00010000 00100000 00010000 00100000 |
| 91 | 01011011 | 00010000 00100000 00010000 00110000 |
| 92 | 01011100 | 00010000 00110000 00000000 00100000 |
| 93 | 01011101 | 00010000 00110000 00000000 00110000 |
| 94 | 01011110 | 00010000 00110000 00010000 00100000 |
| 95 | 01011111 | 00010000 00110000 00010000 00110000 |
| 96 | 01100000 | 00000000 00100000 00100000 00000000 |
| 97 | 01100001 | 00000000 00100000 00100000 00010000 |
| 98 | 01100010 | 00000000 00100000 00110000 00000000 |
| 99 | 01100011 | 00000000 00100000 00110000 00010000 |
| 100 | 01100100 | 00000000 00110000 00100000 00000000 |
| 101 | 01100101 | 00000000 00110000 00100000 00010000 |
| 102 | 01100110 | 00000000 00110000 00110000 00000000 |
| 103 | 01100111 | 00000000 00110000 00110000 00010000 |
| 104 | 01101000 | 00010000 00100000 00100000 00000000 |
| 105 | 01101001 | 00010000 00100000 00100000 00010000 |
| 106 | 01101010 | 00010000 00100000 00110000 00000000 |
| 107 | 01101011 | 00010000 00100000 00110000 00010000 |
| 108 | 01101100 | 00010000 00110000 00100000 00000000 |
| 109 | 01101101 | 00010000 00110000 00100000 00010000 |
| 110 | 01101110 | 00010000 00110000 00110000 00000000 |
| 111 | 01101111 | 00010000 00110000 00110000 00010000 |
| 112 | 01110000 | 00000000 00100000 00100000 00100000 |
| 113 | 01110001 | 00000000 00100000 00100000 00110000 |
| 114 | 01110010 | 00000000 00100000 00110000 00100000 |
| 115 | 01110011 | 00000000 00100000 00110000 00110000 |
| 116 | 01110100 | 00000000 00110000 00100000 00100000 |
| 117 | 01110101 | 00000000 00110000 00100000 00110000 |
| 118 | 01110110 | 00000000 00110000 00110000 00100000 |
| 119 | 01110111 | 00000000 00110000 00110000 00110000 |
| 120 | 01111000 | 00010000 00100000 00100000 00100000 |
| 121 | 01111001 | 00010000 00100000 00100000 00110000 |
| 122 | 01111010 | 00010000 00100000 00110000 00100000 |
| 123 | 01111011 | 00010000 00100000 00110000 00110000 |
| 124 | 01111100 | 00010000 00110000 00100000 00100000 |
| 125 | 01111101 | 00010000 00110000 00100000 00110000 |
| 126 | 01111110 | 00010000 00110000 00110000 00100000 |
| 127 | 01111111 | 00010000 00110000 00110000 00110000 |
| 128 | 10000000 | 00100000 00000000 00000000 00000000 |
| 129 | 10000001 | 00100000 00000000 00000000 00010000 |
| 130 | 10000010 | 00100000 00000000 00010000 00000000 |
| 131 | 10000011 | 00100000 00000000 00010000 00010000 |
| 132 | 10000100 | 00100000 00010000 00000000 00000000 |
| 133 | 10000101 | 00100000 00010000 00000000 00010000 |
| 134 | 10000110 | 00100000 00010000 00010000 00000000 |
| 135 | 10000111 | 00100000 00010000 00010000 00010000 |

APPENDIX

| Dec | Binary | Pattern |
|---|---|---|
| 136 | 10001000 | 00110000 00000000 00000000 00000000 |
| 137 | 10001001 | 00110000 00000000 00000000 00010000 |
| 138 | 10001010 | 00110000 00000000 00010000 00000000 |
| 139 | 10001011 | 00110000 00000000 00010000 00010000 |
| 140 | 10001100 | 00110000 00010000 00000000 00000000 |
| 141 | 10001101 | 00110000 00010000 00000000 00010000 |
| 142 | 10001110 | 00110000 00010000 00010000 00000000 |
| 143 | 10001111 | 00110000 00010000 00010000 00010000 |
| 144 | 10010000 | 00100000 00000000 00000000 00100000 |
| 145 | 10010001 | 00100000 00000000 00000000 00110000 |
| 146 | 10010010 | 00100000 00000000 00010000 00100000 |
| 147 | 10010011 | 00100000 00000000 00010000 00110000 |
| 148 | 10010100 | 00100000 00010000 00000000 00100000 |
| 149 | 10010101 | 00100000 00010000 00000000 00110000 |
| 150 | 10010110 | 00100000 00010000 00010000 00100000 |
| 151 | 10010111 | 00100000 00010000 00010000 00110000 |
| 152 | 10011000 | 00110000 00000000 00000000 00100000 |
| 153 | 10011001 | 00110000 00000000 00000000 00110000 |
| 154 | 10011010 | 00110000 00000000 00010000 00100000 |
| 155 | 10011011 | 00110000 00000000 00010000 00110000 |
| 156 | 10011100 | 00110000 00010000 00000000 00100000 |
| 157 | 10011101 | 00110000 00010000 00000000 00110000 |
| 158 | 10011110 | 00110000 00010000 00010000 00100000 |
| 159 | 10011111 | 00110000 00010000 00010000 00110000 |
| 160 | 10100000 | 00100000 00000000 00100000 00000000 |
| 161 | 10100001 | 00100000 00000000 00100000 00010000 |
| 162 | 10100010 | 00100000 00000000 00110000 00000000 |
| 163 | 10100011 | 00100000 00000000 00110000 00010000 |
| 164 | 10100100 | 00100000 00010000 00100000 00000000 |
| 165 | 10100101 | 00100000 00010000 00100000 00010000 |
| 166 | 10100110 | 00100000 00010000 00110000 00000000 |
| 167 | 10100111 | 00100000 00010000 00110000 00010000 |
| 168 | 10101000 | 00110000 00000000 00100000 00000000 |
| 169 | 10101001 | 00110000 00000000 00100000 00010000 |
| 170 | 10101010 | 00110000 00000000 00110000 00000000 |
| 171 | 10101011 | 00110000 00000000 00110000 00010000 |
| 172 | 10101100 | 00110000 00010000 00100000 00000000 |
| 173 | 10101101 | 00110000 00010000 00100000 00010000 |
| 174 | 10101110 | 00110000 00010000 00110000 00000000 |
| 175 | 10101111 | 00110000 00010000 00110000 00010000 |
| 176 | 10110000 | 00100000 00000000 00100000 00100000 |
| 177 | 10110001 | 00100000 00000000 00100000 00110000 |
| 178 | 10110010 | 00100000 00000000 00110000 00100000 |
| 179 | 10110011 | 00100000 00000000 00110000 00110000 |
| 180 | 10110100 | 00100000 00010000 00100000 00100000 |
| 181 | 10110101 | 00100000 00010000 00100000 00110000 |
| 182 | 10110110 | 00100000 00010000 00110000 00100000 |
| 183 | 10110111 | 00100000 00010000 00110000 00110000 |

APPENDIX

| | | |
|---|---|---|
| 184 | 10111000 | 00110000 00000000 00100000 00100000 |
| 185 | 10111001 | 00110000 00000000 00100000 00110000 |
| 186 | 10111010 | 00110000 00000000 00110000 00100000 |
| 187 | 10111011 | 00110000 00000000 00110000 00110000 |
| 188 | 10111100 | 00110000 00010000 00100000 00100000 |
| 189 | 10111101 | 00110000 00010000 00100000 00110000 |
| 190 | 10111110 | 00110000 00010000 00110000 00100000 |
| 191 | 10111111 | 00110000 00010000 00110000 00110000 |
| 192 | 11000000 | 00100000 00100000 00000000 00000000 |
| 193 | 11000001 | 00100000 00100000 00000000 00010000 |
| 194 | 11000010 | 00100000 00100000 00010000 00000000 |
| 195 | 11000011 | 00100000 00100000 00010000 00010000 |
| 196 | 11000100 | 00100000 00100000 00010000 00010000 |
| 197 | 11000101 | 00100000 00110000 00000000 00000000 |
| 198 | 11000110 | 00100000 00110000 00000000 00010000 |
| 199 | 11000111 | 00100000 00110000 00010000 00000000 |
| | | 00100000 00110000 00010000 00010000 |
| 200 | 11001000 | 00110000 00100000 00000000 00000000 |
| 201 | 11001001 | 00110000 00100000 00000000 00010000 |
| 202 | 11001010 | 00110000 00100000 00010000 00000000 |
| 203 | 11001011 | 00110000 00100000 00010000 00010000 |
| 204 | 11001100 | 00110000 00110000 00000000 00000000 |
| 205 | 11001101 | 00110000 00110000 00000000 00010000 |
| 206 | 11001110 | 00110000 00110000 00010000 00000000 |
| 207 | 11001111 | 00110000 00110000 00010000 00010000 |
| 208 | 11010000 | 00100000 00100000 00000000 00100000 |
| 209 | 11010001 | 00100000 00100000 00000000 00110000 |
| 210 | 11010010 | 00100000 00100000 00010000 00100000 |
| 211 | 11010011 | 00100000 00100000 00010000 00110000 |
| 212 | 11010100 | 00100000 00110000 00000000 00100000 |
| 213 | 11010101 | 00100000 00110000 00000000 00110000 |
| 214 | 11010110 | 00100000 00110000 00010000 00100000 |
| 215 | 11010111 | 00100000 00110000 00010000 00110000 |
| 216 | 11011000 | 00110000 00100000 00000000 00100000 |
| 217 | 11011001 | 00110000 00100000 00000000 00110000 |
| 218 | 11011010 | 00110000 00100000 00000000 00100000 |
| 219 | 11011011 | 00110000 00100000 00010000 00100000 |
| 220 | 11011100 | 00110000 00110000 00000000 00100000 |
| 221 | 11011101 | 00110000 00110000 00000000 00100000 |
| 222 | 11011110 | 00110000 00110000 00000000 00110000 |
| 223 | 11011111 | 00110000 00110000 00010000 00100000 |
| | | 00110000 00110000 00010000 00110000 |
| 224 | 11100000 | 00100000 00100000 00100000 00000000 |
| 225 | 11100001 | 00100000 00100000 00100000 00010000 |
| 226 | 11100010 | 00100000 00100000 00110000 00000000 |
| 227 | 11100011 | 00100000 00100000 00110000 00010000 |
| 228 | 11100100 | 00100000 00110000 00100000 00000000 |
| 229 | 11100101 | 00100000 00110000 00100000 00010000 |
| 230 | 11100110 | 00100000 00110000 00110000 00000000 |
| 231 | 11100111 | 00100000 00110000 00110000 00010000 |

APPENDIX

| | | |
|---|---|---|
| 232 | 11101000 | 00110000 00100000 00100000 00000000 |
| 233 | 11101001 | 00110000 00100000 00100000 00010000 |
| 234 | 11101010 | 00110000 00100000 00110000 00000000 |
| 235 | 11101011 | 00110000 00100000 00110000 00010000 |
| 236 | 11101100 | 00110000 00110000 00100000 00000000 |
| 237 | 11101101 | 00110000 00110000 00100000 00010000 |
| 238 | 11101110 | 00110000 00110000 00110000 00000000 |
| 239 | 11101111 | 00110000 00110000 00110000 00010000 |
| 240 | 11110000 | 00100000 00100000 00100000 00100000 |
| 241 | 11110001 | 00100000 00100000 00100000 00110000 |
| 242 | 11110010 | 00100000 00100000 00110000 00100000 |
| 243 | 11110011 | 00100000 00100000 00110000 00110000 |
| 244 | 11110100 | 00100000 00110000 00100000 00100000 |
| 245 | 11110101 | 00100000 00110000 00100000 00110000 |
| 246 | 11110110 | 00100000 00110000 00110000 00100000 |
| 247 | 11110111 | 00100000 00110000 00110000 00110000 |
| 248 | 11111000 | 00110000 00100000 00100000 00100000 |
| 249 | 11111001 | 00110000 00100000 00100000 00110000 |
| 250 | 11111010 | 00110000 00100000 00110000 00100000 |
| 251 | 11111011 | 00110000 00100000 00110000 00110000 |
| 252 | 11111100 | 00110000 00110000 00100000 00100000 |
| 253 | 11111101 | 00110000 00110000 00100000 00110000 |
| 254 | 11111110 | 00110000 00110000 00110000 00100000 |
| 255 | 11111111 | 00110000 00110000 00110000 00110000 |

APPENDIX

LOOKUP TABLE 4 :

| ENTRY | FROM BINARY REPRESENTATION | TO BINARY REPRESENTATION |
|---|---|---|
| 0 | 00000000 | 00000000 00000000 00000000 00000000 |
| 1 | 00000001 | 00000000 00000000 00000000 01000000 |
| 2 | 00000010 | 00000000 00000000 01000000 00000000 |
| 3 | 00000011 | 00000000 00000000 01000000 01000000 |
| 4 | 00000100 | 00000000 01000000 00000000 00000000 |
| 5 | 00000101 | 00000000 01000000 00000000 01000000 |
| 6 | 00000110 | 00000000 01000000 01000000 00000000 |
| 7 | 00000111 | 00000000 01000000 01000000 01000000 |
| 8 | 00001000 | 01000000 00000000 00000000 00000000 |
| 9 | 00001001 | 01000000 00000000 00000000 01000000 |
| 10 | 00001010 | 01000000 00000000 01000000 00000000 |
| 11 | 00001011 | 01000000 00000000 01000000 01000000 |
| 12 | 00001100 | 01000000 01000000 00000000 00000000 |
| 13 | 00001101 | 01000000 01000000 00000000 01000000 |
| 14 | 00001110 | 01000000 01000000 01000000 00000000 |
| 15 | 00001111 | 01000000 01000000 01000000 01000000 |
| 16 | 00010000 | 00000000 00000000 00000000 10000000 |
| 17 | 00010001 | 00000000 00000000 00000000 11000000 |
| 18 | 00010010 | 00000000 00000000 01000000 10000000 |
| 19 | 00010011 | 00000000 00000000 01000000 11000000 |
| 20 | 00010100 | 00000000 01000000 00000000 10000000 |
| 21 | 00010101 | 00000000 01000000 00000000 11000000 |
| 22 | 00010110 | 00000000 01000000 01000000 10000000 |
| 23 | 00010111 | 00000000 01000000 01000000 11000000 |
| 24 | 00011000 | 01000000 00000000 00000000 10000000 |
| 25 | 00011001 | 01000000 00000000 00000000 11000000 |
| 26 | 00011010 | 01000000 00000000 01000000 10000000 |
| 27 | 00011011 | 01000000 00000000 01000000 11000000 |
| 28 | 00011100 | 01000000 01000000 00000000 10000000 |
| 29 | 00011101 | 01000000 01000000 00000000 11000000 |
| 30 | 00011110 | 01000000 01000000 01000000 10000000 |
| 31 | 00011111 | 01000000 01000000 01000000 11000000 |
| 32 | 00100000 | 00000000 00000000 10000000 00000000 |
| 33 | 00100001 | 00000000 00000000 10000000 01000000 |
| 34 | 00100010 | 00000000 00000000 11000000 00000000 |
| 35 | 00100011 | 00000000 00000000 11000000 01000000 |
| 36 | 00100100 | 00000000 01000000 10000000 00000000 |
| 37 | 00100101 | 00000000 01000000 10000000 01000000 |
| 38 | 00100110 | 00000000 01000000 11000000 00000000 |
| 39 | 00100111 | 00000000 01000000 11000000 01000000 |

APPENDIX

| | | |
|---|---|---|
| 40 | 00101000 | 01000000 00000000 10000000 00000000 |
| 41 | 00101001 | 01000000 00000000 10000000 01000000 |
| 42 | 00101010 | 01000000 00000000 11000000 00000000 |
| 43 | 00101011 | 01000000 00000000 11000000 01000000 |
| 44 | 00101100 | 01000000 01000000 10000000 00000000 |
| 45 | 00101101 | 01000000 01000000 10000000 01000000 |
| 46 | 00101110 | 01000000 01000000 11000000 00000000 |
| 47 | 00101111 | 01000000 01000000 11000000 01000000 |
| 48 | 00110000 | 00000000 00000000 10000000 10000000 |
| 49 | 00110001 | 00000000 00000000 10000000 11000000 |
| 50 | 00110010 | 00000000 00000000 11000000 10000000 |
| 51 | 00110011 | 00000000 00000000 11000000 11000000 |
| 52 | 00110100 | 00000000 01000000 10000000 10000000 |
| 53 | 00110101 | 00000000 01000000 10000000 11000000 |
| 54 | 00110110 | 00000000 01000000 11000000 10000000 |
| 55 | 00110111 | 00000000 01000000 11000000 11000000 |
| 56 | 00111000 | 01000000 00000000 10000000 10000000 |
| 57 | 00111001 | 01000000 00000000 10000000 11000000 |
| 58 | 00111010 | 01000000 00000000 11000000 10000000 |
| 59 | 00111011 | 01000000 00000000 11000000 11000000 |
| 60 | 00111100 | 01000000 01000000 10000000 10000000 |
| 61 | 00111101 | 01000000 01000000 10000000 11000000 |
| 62 | 00111110 | 01000000 01000000 11000000 10000000 |
| 63 | 00111111 | 01000000 01000000 11000000 11000000 |
| 64 | 01000000 | 00000000 10000000 00000000 00000000 |
| 65 | 01000001 | 00000000 10000000 00000000 01000000 |
| 66 | 01000010 | 00000000 10000000 01000000 00000000 |
| 67 | 01000011 | 00000000 10000000 01000000 01000000 |
| 68 | 01000100 | 00000000 11000000 00000000 00000000 |
| 69 | 01000101 | 00000000 11000000 00000000 01000000 |
| 70 | 01000110 | 00000000 11000000 01000000 00000000 |
| 71 | 01000111 | 00000000 11000000 01000000 01000000 |
| 72 | 01001000 | 01000000 10000000 00000000 00000000 |
| 73 | 01001001 | 01000000 10000000 00000000 01000000 |
| 74 | 01001010 | 01000000 10000000 01000000 00000000 |
| 75 | 01001011 | 01000000 10000000 01000000 01000000 |
| 76 | 01001100 | 01000000 11000000 00000000 00000000 |
| 77 | 01001101 | 01000000 11000000 00000000 01000000 |
| 78 | 01001110 | 01000000 11000000 01000000 00000000 |
| 79 | 01001111 | 01000000 11000000 01000000 01000000 |
| 80 | 01010000 | 00000000 10000000 00000000 10000000 |
| 81 | 01010001 | 00000000 10000000 00000000 11000000 |
| 82 | 01010010 | 00000000 10000000 01000000 10000000 |
| 83 | 01010011 | 00000000 10000000 01000000 11000000 |
| 84 | 01010100 | 00000000 11000000 00000000 10000000 |
| 85 | 01010101 | 00000000 11000000 00000000 11000000 |
| 86 | 01010110 | 00000000 11000000 01000000 10000000 |
| 87 | 01010111 | 00000000 11000000 01000000 11000000 |

APPENDIX

| | | | | | |
|---|---|---|---|---|---|
| 88 | 01011000 | 01000000 | 10000000 | 00000000 | 10000000 |
| 89 | 01011001 | 01000000 | 10000000 | 00000000 | 11000000 |
| 90 | 01011010 | 01000000 | 10000000 | 01000000 | 10000000 |
| 91 | 01011011 | 01000000 | 10000000 | 01000000 | 11000000 |
| 92 | 01011100 | 01000000 | 11000000 | 00000000 | 10000000 |
| 93 | 01011101 | 01000000 | 11000000 | 00000000 | 11000000 |
| 94 | 01011110 | 01000000 | 11000000 | 01000000 | 10000000 |
| 95 | 01011111 | 01000000 | 11000000 | 01000000 | 11000000 |
| 96 | 01100000 | 00000000 | 10000000 | 10000000 | 00000000 |
| 97 | 01100001 | 00000000 | 10000000 | 10000000 | 01000000 |
| 98 | 01100010 | 00000000 | 10000000 | 11000000 | 00000000 |
| 99 | 01100011 | 00000000 | 10000000 | 11000000 | 01000000 |
| 100 | 01100100 | 00000000 | 11000000 | 10000000 | 00000000 |
| 101 | 01100101 | 00000000 | 11000000 | 10000000 | 01000000 |
| 102 | 01100110 | 00000000 | 11000000 | 11000000 | 00000000 |
| 103 | 01100111 | 00000000 | 11000000 | 11000000 | 01000000 |
| 104 | 01101000 | 01000000 | 10000000 | 10000000 | 00000000 |
| 105 | 01101001 | 01000000 | 10000000 | 10000000 | 01000000 |
| 106 | 01101010 | 01000000 | 10000000 | 11000000 | 00000000 |
| 107 | 01101011 | 01000000 | 10000000 | 11000000 | 01000000 |
| 108 | 01101100 | 01000000 | 11000000 | 10000000 | 00000000 |
| 109 | 01101101 | 01000000 | 11000000 | 10000000 | 01000000 |
| 110 | 01101110 | 01000000 | 11000000 | 11000000 | 00000000 |
| 111 | 01101111 | 01000000 | 11000000 | 11000000 | 01000000 |
| 112 | 01110000 | 00000000 | 10000000 | 10000000 | 10000000 |
| 113 | 01110001 | 00000000 | 10000000 | 10000000 | 11000000 |
| 114 | 01110010 | 00000000 | 10000000 | 11000000 | 10000000 |
| 115 | 01110011 | 00000000 | 10000000 | 11000000 | 11000000 |
| 116 | 01110100 | 00000000 | 11000000 | 10000000 | 10000000 |
| 117 | 01110101 | 00000000 | 11000000 | 10000000 | 11000000 |
| 118 | 01110110 | 00000000 | 11000000 | 11000000 | 10000000 |
| 119 | 01110111 | 00000000 | 11000000 | 11000000 | 11000000 |
| 120 | 01111000 | 01000000 | 10000000 | 10000000 | 10000000 |
| 121 | 01111001 | 01000000 | 10000000 | 10000000 | 11000000 |
| 122 | 01111010 | 01000000 | 10000000 | 11000000 | 10000000 |
| 123 | 01111011 | 01000000 | 10000000 | 11000000 | 11000000 |
| 124 | 01111100 | 01000000 | 11000000 | 10000000 | 10000000 |
| 125 | 01111101 | 01000000 | 11000000 | 10000000 | 11000000 |
| 126 | 01111110 | 01000000 | 11000000 | 11000000 | 10000000 |
| 127 | 01111111 | 01000000 | 11000000 | 11000000 | 11000000 |
| 128 | 10000000 | 10000000 | 00000000 | 00000000 | 00000000 |
| 129 | 10000001 | 10000000 | 00000000 | 00000000 | 01000000 |
| 130 | 10000010 | 10000000 | 00000000 | 01000000 | 00000000 |
| 131 | 10000011 | 10000000 | 00000000 | 01000000 | 01000000 |
| 132 | 10000100 | 10000000 | 01000000 | 00000000 | 00000000 |
| 133 | 10000101 | 10000000 | 01000000 | 00000000 | 01000000 |
| 134 | 10000110 | 10000000 | 01000000 | 01000000 | 00000000 |
| 135 | 10000111 | 10000000 | 01000000 | 01000000 | 01000000 |

APPENDIX

| | | |
|---|---|---|
| 136 | 10001000 | 11000000 00000000 00000000 00000000 |
| 137 | 10001001 | 11000000 00000000 00000000 01000000 |
| 138 | 10001010 | 11000000 00000000 01000000 00000000 |
| 139 | 10001011 | 11000000 00000000 01000000 01000000 |
| 140 | 10001100 | 11000000 01000000 00000000 00000000 |
| 141 | 10001101 | 11000000 01000000 00000000 01000000 |
| 142 | 10001110 | 11000000 01000000 01000000 00000000 |
| 143 | 10001111 | 11000000 01000000 01000000 01000000 |
| 144 | 10010000 | 10000000 00000000 00000000 10000000 |
| 145 | 10010001 | 10000000 00000000 00000000 11000000 |
| 146 | 10010010 | 10000000 00000000 01000000 10000000 |
| 147 | 10010011 | 10000000 00000000 01000000 11000000 |
| 148 | 10010100 | 10000000 01000000 00000000 10000000 |
| 149 | 10010101 | 10000000 01000000 00000000 11000000 |
| 150 | 10010110 | 10000000 01000000 01000000 10000000 |
| 151 | 10010111 | 10000000 01000000 01000000 11000000 |
| 152 | 10011000 | 11000000 00000000 00000000 10000000 |
| 153 | 10011001 | 11000000 00000000 00000000 11000000 |
| 154 | 10011010 | 11000000 00000000 01000000 10000000 |
| 155 | 10011011 | 11000000 00000000 01000000 11000000 |
| 156 | 10011100 | 11000000 01000000 00000000 10000000 |
| 157 | 10011101 | 11000000 01000000 00000000 11000000 |
| 158 | 10011110 | 11000000 01000000 01000000 10000000 |
| 159 | 10011111 | 11000000 01000000 01000000 11000000 |
| 160 | 10100000 | 10000000 00000000 10000000 00000000 |
| 161 | 10100001 | 10000000 00000000 10000000 01000000 |
| 162 | 10100010 | 10000000 00000000 11000000 00000000 |
| 163 | 10100011 | 10000000 00000000 11000000 01000000 |
| 164 | 10100100 | 10000000 01000000 10000000 00000000 |
| 165 | 10100101 | 10000000 01000000 10000000 01000000 |
| 166 | 10100110 | 10000000 01000000 11000000 00000000 |
| 167 | 10100111 | 10000000 01000000 11000000 01000000 |
| 168 | 10101000 | 11000000 00000000 10000000 00000000 |
| 169 | 10101001 | 11000000 00000000 10000000 01000000 |
| 170 | 10101010 | 11000000 00000000 11000000 00000000 |
| 171 | 10101011 | 11000000 00000000 11000000 01000000 |
| 172 | 10101100 | 11000000 01000000 10000000 00000000 |
| 173 | 10101101 | 11000000 01000000 10000000 01000000 |
| 174 | 10101110 | 11000000 01000000 11000000 00000000 |
| 175 | 10101111 | 11000000 01000000 11000000 01000000 |
| 176 | 10110000 | 10000000 00000000 10000000 10000000 |
| 177 | 10110001 | 10000000 00000000 10000000 11000000 |
| 178 | 10110010 | 10000000 00000000 11000000 10000000 |
| 179 | 10110011 | 10000000 00000000 11000000 11000000 |
| 180 | 10110100 | 10000000 01000000 10000000 10000000 |
| 181 | 10110101 | 10000000 01000000 10000000 11000000 |
| 182 | 10110110 | 10000000 01000000 11000000 10000000 |
| 183 | 10110111 | 10000000 01000000 11000000 11000000 |

APPENDIX

Page 23 of 24

| | | |
|---|---|---|
| 184 | 10111000 | 11000000 00000000 10000000 10000000 |
| 185 | 10111001 | 11000000 00000000 10000000 11000000 |
| 186 | 10111010 | 11000000 00000000 11000000 10000000 |
| 187 | 10111011 | 11000000 00000000 11000000 11000000 |
| 188 | 10111100 | 11000000 01000000 10000000 10000000 |
| 189 | 10111101 | 11000000 01000000 10000000 11000000 |
| 190 | 10111110 | 11000000 01000000 11000000 10000000 |
| 191 | 10111111 | 11000000 01000000 11000000 11000000 |
| | | |
| 192 | 11000000 | 10000000 10000000 00000000 00000000 |
| 193 | 11000001 | 10000000 10000000 00000000 01000000 |
| 194 | 11000010 | 10000000 10000000 01000000 00000000 |
| 195 | 11000011 | 10000000 10000000 01000000 01000000 |
| 196 | 11000100 | 10000000 11000000 00000000 00000000 |
| 197 | 11000101 | 10000000 11000000 00000000 01000000 |
| 198 | 11000110 | 10000000 11000000 01000000 00000000 |
| 199 | 11000111 | 10000000 11000000 01000000 01000000 |
| | | |
| 200 | 11001000 | 11000000 10000000 00000000 00000000 |
| 201 | 11001001 | 11000000 10000000 00000000 01000000 |
| 202 | 11001010 | 11000000 10000000 01000000 00000000 |
| 203 | 11001011 | 11000000 10000000 01000000 01000000 |
| 204 | 11001100 | 11000000 11000000 00000000 00000000 |
| 205 | 11001101 | 11000000 11000000 00000000 01000000 |
| 206 | 11001110 | 11000000 11000000 01000000 00000000 |
| 207 | 11001111 | 11000000 11000000 01000000 01000000 |
| | | |
| 208 | 11010000 | 10000000 10000000 00000000 10000000 |
| 209 | 11010001 | 10000000 10000000 00000000 11000000 |
| 210 | 11010010 | 10000000 10000000 01000000 10000000 |
| 211 | 11010011 | 10000000 10000000 01000000 11000000 |
| 212 | 11010100 | 10000000 11000000 00000000 10000000 |
| 213 | 11010101 | 10000000 11000000 00000000 11000000 |
| 214 | 11010110 | 10000000 11000000 01000000 10000000 |
| 215 | 11010111 | 10000000 11000000 01000000 11000000 |
| | | |
| 216 | 11011000 | 11000000 10000000 00000000 10000000 |
| 217 | 11011001 | 11000000 10000000 00000000 11000000 |
| 218 | 11011010 | 11000000 10000000 01000000 10000000 |
| 219 | 11011011 | 11000000 10000000 01000000 11000000 |
| 220 | 11011100 | 11000000 11000000 00000000 10000000 |
| 221 | 11011101 | 11000000 11000000 00000000 11000000 |
| 222 | 11011110 | 11000000 11000000 01000000 10000000 |
| 223 | 11011111 | 11000000 11000000 01000000 11000000 |
| | | |
| 224 | 11100000 | 10000000 10000000 10000000 00000000 |
| 225 | 11100001 | 10000000 10000000 10000000 01000000 |
| 226 | 11100010 | 10000000 10000000 11000000 00000000 |
| 227 | 11100011 | 10000000 10000000 11000000 01000000 |
| 228 | 11100100 | 10000000 11000000 10000000 00000000 |
| 229 | 11100101 | 10000000 11000000 10000000 01000000 |
| 230 | 11100110 | 10000000 11000000 11000000 00000000 |
| 231 | 11100111 | 10000000 11000000 11000000 01000000 |

APPENDIX

```
232     11101000
233     11101001           11000000 10000000 10000000 00000000
234     11101010           11000000 10000000 10000000 01000000
235     11101011           11000000 10000000 11000000 00000000
236     11101100           11000000 10000000 11000000 01000000
237     11101101           11000000 11000000 10000000 00000000
238     11101110           11000000 11000000 10000000 01000000
239     11101111           11000000 11000000 11000000 00000000
                           11000000 11000000 11000000 01000000

240     11110000
241     11110001           10000000 10000000 10000000 10000000
242     11110010           10000000 10000000 10000000 11000000
243     11110011           10000000 10000000 11000000 10000000
244     11110100           10000000 10000000 11000000 11000000
245     11110101           10000000 11000000 10000000 10000000
246     11110110           10000000 11000000 10000000 11000000
247     11110111           10000000 11000000 11000000 10000000
                           10000000 11000000 11000000 11000000

248     11111000
249     11111001           11000000 10000000 10000000 10000000
250     11111010           11000000 10000000 10000000 11000000
251     11111011           11000000 10000000 11000000 10000000
252     11111100           11000000 10000000 11000000 11000000
253     11111101           11000000 11000000 10000000 10000000
254     11111110           11000000 11000000 10000000 11000000
255     11111111           11000000 11000000 11000000 10000000
                           11000000 11000000 11000000 11000000
```

The embodiments of the invention of which an exclusive property or privilege is claimed are defined as follows:

1. In a 32-bit operating system, a method of rotating by 90° a block of bi-level image data having 8 rows by 8 columns of pixel data bits, comprising the computer implemented steps of:

generating an intermediate matrix having 8 rows by 8 columns of pixel data bits from the pixel data bits of the block, wherein the block is divided into four row pairs and the intermediate matrix is divided into four nibble column pairs, each said row pair corresponding to one of the nibble column pairs, each row of each row pair being divided into two halves, one of said halves of one row of each row pair being rotated 90° and translated to form a top half of one nibble column of the corresponding nibble column pair, the other one of said halves of said one row also being rotated 90° and translated to form a top half of the other nibble column of the corresponding nibble column pair, one of said halves of the other row of each row pair being rotated 90° and translated to form a bottom half of said one nibble column, the other one of said halves of said other row being rotated 90° and translated to form a bottom half of the other nibble column of the corresponding nibble column pair;

saving the rows of the intermediate matrix sequentially into first and second 32-bit processor registers;

copying the first 32-bit register into a third 32-bit processor register and the second 32-bit register into a fourth 32-bit processor register;

shifting each of the first and second registers by one bit in opposite directions; and overlaying alternate bits from the fourth register onto the first register and from the third register onto the second register.

2. The method, according to claim 1, wherein the step of generating an intermediate matrix comprises generating an intermediate matrix wherein successive row pairs from top to bottom in the block correspond to successive nibble column pairs from right to left in the intermediate matrix, and wherein said one row of each row pair is the top row of each said row pair.

3. The method according to claim 2, wherein the step of shifting each of the first and second registers by one bit in opposite directions comprises shifting the first register by one bit left and shifting the second register by one bit right.

4. The method according to claim 3, wherein the step of overlaying alternate bits further comprises the steps of zeroing out all odd bits of the first and fourth registers and all even bits of the second and third register, and logical ORing the first register with the fourth register and the register with the third register.

5. The method according to claim 1, wherein the step of generating an intermediate matrix comprises generating an intermediate matrix wherein successive row pairs from top to bottom in the block correspond to successive nibble column pairs from left to right in the intermediate matrix, and wherein said one row of each row pair is the bottom row of each said row pair.

6. The method, according to claim 5, wherein the step of shifting each of the first and second register by one bit in opposite directions comprises shifting the first register by one bit right and shifting the second register by one bit left.

7. The method according to claim 6, wherein the step of overlaying alternate bits further comprises the steps of zeroing out all even bits of the first and fourth registers and all odd bits of the second and third registers, and logical ORing the first register with the fourth register and the second register with the third register.

8. The method, according to claim 1, wherein the step of generating an intermediate matrix comprises:

obtaining a first set of 4-byte values from at least one lookup table for each odd-numbered row from the block and dynamically overlaying said first set of 4-byte values in the first 32-bit register; and obtaining a second set of 4-byte values from said at least one lookup table for each even-numbered row from the block and dynamically overlaying said second set of 4-byte values in the second 32-bit register.

9. In a 32-bit operating system, a method of rotating a bi-level image by 90°, comprising the computer implemented steps of:

a) selecting an unrotated 8 by 8 pixel matrix from the image data;

b) generating an intermediate matrix having 8 rows by 8 columns of pixel data bits from the pixel data bits of the block, wherein the block is divided into four row pairs and the intermediate matrix is divided into four nibble column pairs, each said row pair corresponding to one of the nibble column pairs, each row of each row pair being divided into two halves, one of said halves of one row of each row pair being rotated 90° and translated to form a top half of one nibble column of the corresponding nibble column pair, the other one of said halves of said one row also being rotated 90° and translated to form a top half of the other nibble column of the corresponding nibble column pair, one of said halves of the other row of each row pair being rotated 90° and translated to form a bottom half of said one nibble column, the other one of said halves of said other row being rotated 90° and translated to form a bottom half of the other nibble column of the corresponding nibble column pair;

c) saving the rows of the intermediate matrix sequentially into first and second 32-bit processor registers;

d) copying the first 32-bit register into a third 32-bit processor register and the second 32-bit register into a fourth 32-bit processor register;

e) shifting each of the first and second registers by one bit in opposite directions; and f) overlaying alternate bits from the fourth register onto the first register and from the third register onto the second register; and g) repeating steps a) through f) until the image has been rotated.

10. A 32-bit system for operating a block of bi-level image data having 8 rows by 8 columns of pixel data bits, comprising:

means for generating an intermediate matrix having 8 rows by 8 columns of pixel data bits from the pixel data bits of the block, wherein the block is divided into four row pairs and the intermediate matrix is divided into four nibble column pairs, each said row pair corresponding to one of the nibble column pairs, each row of each row pair being divided into two halves, one of said halves of one row of each row pair being rotated 90° and translated to form a top half of one nibble column of the corresponding nibble column pair, the other one of said halves of said one row also being rotated 90° and translated to form a top half of the other nibble column of the corresponding nibble column pair, one of said halves of the other row of each row pair being rotated 90° and translated to form a bottom half of said one nibble column, the other one of said halves of said other row being rotated 90° and translated to form a bottom half of the other nibble column of the corresponding nibble column pair;

at least first, second, third, and fourth 32-bit processor registers, the first and third registers for saving, in duplicate, the first four rows of the intermediate matrix and the second and fourth registers for saving, in duplicate, the remaining four rows of the intermediate matrix;

means for shifting each of the first and second registers by one bit in opposite directions; and means for overlaying alternate bits from the fourth register onto the first register and from the third register onto the second register.

11. A system, according to claim 10, wherein the means for generating an intermediate matrix comprises at least one lookup table.

12. A system, according to claim 11, wherein said at least one lookup table comprises multiple look tables, each lookup table being adapted for generating a 4-byte value for at least one row from the block.

13. A system, according to claim 10, wherein the means for generating an intermediate matrix comprises:

four lookup tables, each lookup table being adapted for generating 4-byte values for at least two rows from the block; and means for dynamically overlaying 4-byte values from alternate rows from the block into one of said registers.

* * * * *